United States Patent
Stephenson

[15] 3,638,178
[45] Jan. 25, 1972

[54] METHOD FOR PROCESSING THREE-DIMENSIONAL SEISMIC DATA TO SELECT AND PLOT SAID DATA ON A TWO-DIMENSIONAL DISPLAY SURFACE

[72] Inventor: Lee P. Stephenson, Fullerton, Calif.

[73] Assignee: Chevron Research Company, San Francisco, Calif.

[22] Filed: Dec. 1, 1969

[21] Appl. No.: 878,968

Related U.S. Application Data

[63] Continuation of Ser. No. 706,470, Feb. 19, 1968, abandoned, Continuation of Ser. No. 452,582, Apr. 28, 1965, Continuation-in-part of Ser. No. 99,213, Mar. 29, 1961, abandoned.

[52] U.S. Cl..............................................340/15.5
[51] Int. Cl..........................................G01v 1/24, G01v 1/34
[58] Field of Search..................................340/15.5

[56] References Cited

UNITED STATES PATENTS

| | | | |
|---|---|---|---|
| 2,923,368 | 2/1960 | Hopkins | 181/.5 |
| 2,703,150 | 3/1955 | Rieber | 340/15.5 |

*Primary Examiner*—Rodney D. Bennett, Jr.
*Assistant Examiner*—N. Moskowitz
*Attorney*—A. L. Snow, F. E. Johnston, R. L. Freeland, Jr. and G. W. Wessan

[57] ABSTRACT

A method and apparatus for processing seismic data to display representations of reflectors within a three-dimensional volume. The data is collected with a surface geophone array in response to a single seismic source. Separate portions of the data are processed to identify reflectors with respect to certain of the geophones. These separately processed data are then compared to isolate common identifications of the same reflector. Coordinate information applicable to the isolated identification are then resolved to position the reflector within the three-dimensional volume. A projection of that position is then produced on a display surface to provide a two-dimensional representation of the reflectors within the three-dimensional volume.

18 Claims, 18 Drawing Figures

IN-LINE EVENT

PULSE OF IN-LINE EVENT

ELONGATED IN-LINE EVENT

TIME DELAYED CROSS EVENT

PULSE OF CROSS EVENT

CROSS EVENT

INVENTOR
LEE P. STEPHENSON
BY
ATTORNEYS

INVENTOR
LEE P. STEPHENSON

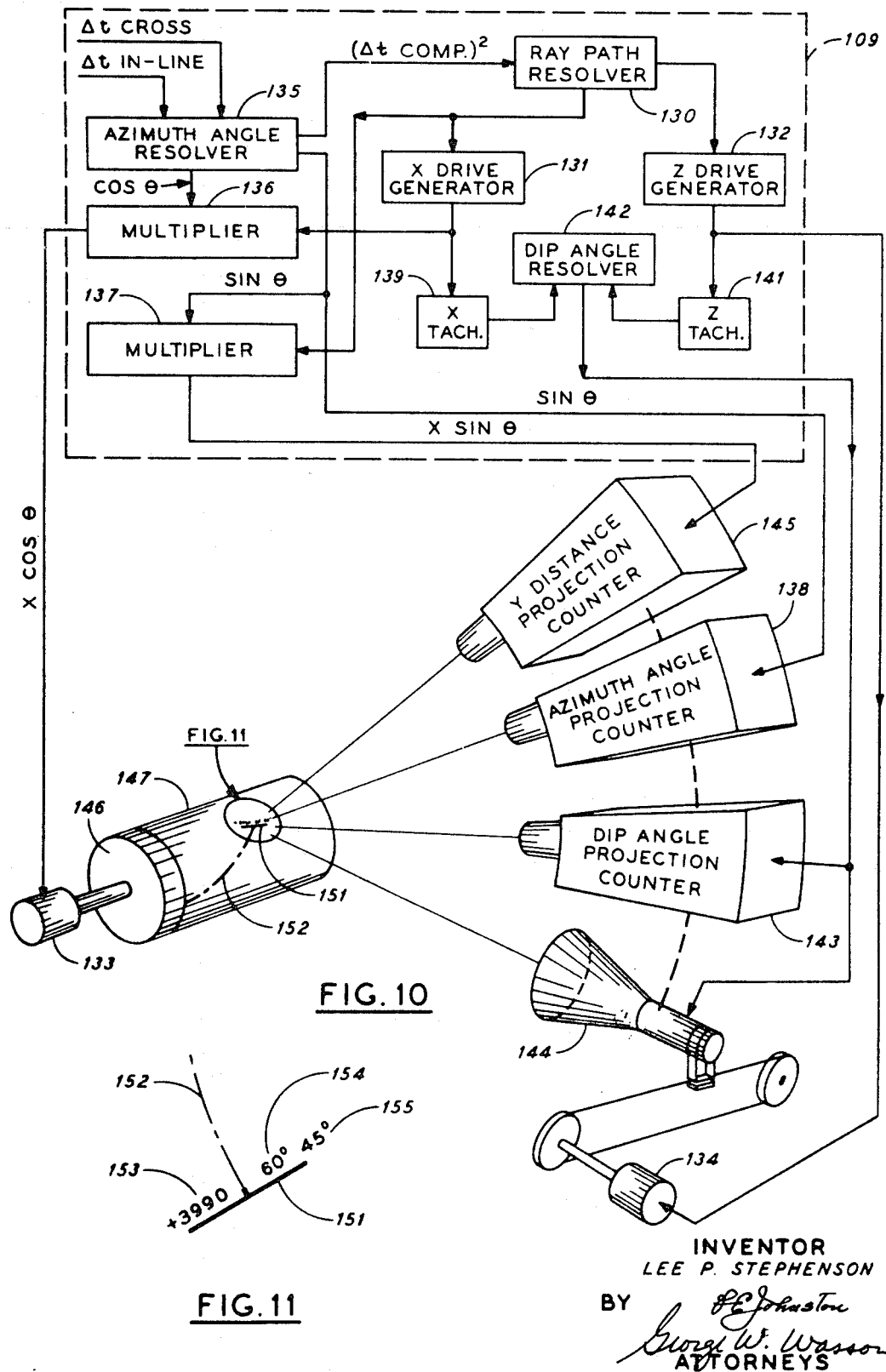

INVENTOR
LEE P. STEPHENSON
BY
ATTORNEYS

METHOD FOR PROCESSING THREE-DIMENSIONAL SEISMIC DATA TO SELECT AND PLOT SAID DATA ON A TWO-DIMENSIONAL DISPLAY SURFACE

This application is a streamlined continuation of Ser. No. 706,470, filed Feb. 19, 1968, now abandoned, which is a continuation of my copending application Ser. No. 452,582, filed Apr. 28, 1965, which is a continuation-in-part of now abandoned application Ser. No. 99,213, filed Mar. 29, 1961.

This invention relates to seismic exploration, and more particularly to methods and apparatus for processing seismic data containing three-dimensional information from subsurface earth formations.

Most prior art methods and apparatus for processing seismic data provide visible seismic records corresponding to reflected seismic energy received at a plurality of surface geophones. The records are time base indications of the movement of the earth's surface in response to the reflection of seismic energy by subsurface reflecting horizons. The source of seismic energy is usually an explosive charge detonated at or very close to the earth's surface and the earth movements are detected by surface geophones positioned with respect to the seismic energy source.

In the usual seismic exploration practice, a seismologist acquires a plurality of seismic records along a survey line across the surface of the earth, and interprets the position and attitude of subsurface earth formations by analyzing these records. He usually applies necessary fixed and variable time corrections to the records to remove the effects of weathering and normal move-out variations on the reflections shown in the records. He then carefully analyzes the seismic records to select seismic events representing reflection information and plots representations of these events, with the aid of a wavefront chart, in spatial locations with respect to a reference point related to the shot point of the energy source for each particular record.

The prior art of seismology includes methods for detecting directional seismic information within conventional seismic records, namely, the developments of Frank H. Reiber, who suggested the detection of directional information by suitably combining signals from several surface geophones. In the process suggested by Reiber the individual instantaneous signals across all traces of a multitrace record are repeatedly summed to produce a plurality of combination signals. Separate ones of this plurality simulate separate shifts of individual traces with respect to neighboring traces. The repeated summations of the original record traces develops a new record of traces containing directional information in the form of signal events. The total number of traces in the new record will be determined in part by the number of different directions in which one desires to search.

In my copending application Ser. No. 416,947, filed Sept. 25, 1964, as a continuation-in-part of Ser. No. 803,906, filed Apr. 3, 1959, now abandoned, entitled "Automatic Seismic Data Processing Method and Apparatus," assigned to the same assignee as the present application, a system is disclosed for automatically processing seismic data to a migrated display of directional information. Parts of the system are also disclosed in issued U.S. Pat. Nos. 3,038,661, "Apparatus for Generating Sine and Cosine Functions," issued June 12, 1962, to W. W. Klein, Jr.; 3,129,405, "Very Fast Servo Plotter," issued Apr. 14, 1964, to W. E. Shoemaker; 3,149,302, "Information Selection Programmer Employing Relative Amplitude, Absolute Amplitude and Time Coherence," issued Sept. 15, 1964, to W. W. Klein, Jr., and Lee P. Stephenson; and 3,149,303, "Seismic Cross Section Plotter," issued Sept. 15, 1964, to W. W. Klein, et al. The patents and the above application illustrate the recording of surface geophone signals on a multitrace magnetic record, the reproduction of those records with individually movable reproducing heads, and the summation of individual signals to produce the directional seismic information. The patents further disclose methods and apparatus for automatically selecting events within individual directional seismic traces through a process of comparison with neighboring directional seismic traces. By that comparison process an event may be automatically selected as an identification of a subsurface seismic reflector. Furthermore, the patents also disclose a method and apparatus for automatically plotting migrated directional seismic traces in accordance with a predetermined variation in the velocity of transmission of seismic energy within an earth formation. The automatic plotting apparatus displays the selected events along the computed ray paths of seismic energy travelling from the surface explosion to the subsurface seismic reflectors and back to the spread of surface geophones.

Displays of migrated seismic information have been employed to provide support for cross sections representing the layering or folding of a subsurface earth formation. One deficiency of such a cross section, whether done automatically or by hand, is in the information it attempts to display. This deficiency is caused by the unavoidable inclusion into the display of seismic information not necessarily in the plane of the cross section. The information is displayed, in the most general case, as though it were derived from the vertical plane extending directly below and including the geophone spread and being in a plane of interest through the subsurface formations. The inclusion is unavoidable since with a single line of surface geophones it is impossible to determine whether the displayed information actually was derived from that vertical plane including the line of the geophone spread or from other locations outside of that plane. A record from a single line of surface geophones provides only information concerning the time between the detonation of the surface charge and the receipt of reflection energy at each of the surface geophones. The display of this information merely represents the time and, indirectly, the distance from a reference point to a subsurface reflector but cannot discriminate against reflectors outside of a selected plane through the surface spread.

It has been recognized that this deficiency can be alleviated by providing additional seismic records from surveys either paralleling or crossing the line of the original seismic survey. By comparing the original records and the additional records the seismologist is able to interpret the information and to identify true spatial locations for reflectors indicated in the migrated display of the original information.

The present application discloses methods and apparatus for automatically processing seismic data received at a surface geophone spread to derive directional seismic information, to select events within the directional seismic information, and to plot the selected directional seismic events on a two-dimensional display surface with indications of the true three-dimensional position for the subsurface reflectors from which the seismic data were received.

For the purpose of clarity in describing the positioning of geophones, the term "spread" is intended to mean a line of spaced geophones, and the term "spread configuration" is intended to mean a group of line spreads, each line having some relationship to other lines. "Spread configuration" also includes a group of spaced geophones in a pattern of concentric circles.

For the purposes of three-dimensional seismology as described herein, all of the data received by the geophone spread will be processed to define and identify seismic events within directional seismic traces. The events then will be correlated among the traces to select particular events for plotting. At the same time the coordinates of the selected events will be appropriately established. Having then identified and selected an event and its coordinates, the identification of the selected event will be applied to the automatic plotting device where a display representing the event will be plotted in accordance with the identification of the event. The display may take the form of a representation of the event where it would be along a ray path if the ray path were plotted. Furthermore, the representation may include information regarding the attitude of the event within the volume being surveyed.

A desirable form for displaying three-dimensional data on a two-dimensional surface is that known as orthographic projection. Orthographic projection, as the term is used in this specification, means a display of a three-dimensional volume on a two-dimensional surface. Any particular position within the volume will be displayed on the surface where that position would be if it were projected along a line from its actual position perpendicular the plane of display. In a display of selected seismic events from within a three-dimensional volume, each event is identified along a seismic energy ray path within the volume and plotted on a display surface in the position that event would assume if an observer were to stand at infinity, look toward the display surface and mark an image on the display surface where the line of projection from the event intersects the plane of display. Each selected event is plotted as though it were along the projection of the actual ray path that the seismic energy followed within the volume. All reflecting surfaces within the volume identified by plotted events from records from more than one spread configuration will correlate in a line of profiles as the events are plotted. The selected events will assume an angular position with respect to a reference datum plane in accordance with the attitude (dip and/or strike angle) of the reflector within the surveyed volume.

The object of the present invention is an automatic method for processing seismic data to extract three-dimensional directional information.

Another object of the present invention is the provision of automatic apparatus capable of performing the method of the foregoing object.

A further object of the present invention is the provision of a method and apparatus for processing seismic data received from within a three-dimensional volume of an earth formation that will permit rapid and economic reduction of the data to selected seismic events with appropriate coordinate identifications.

A further object of the present invention is the provision of a method and apparatus for processing seismic records individually derived from separate multigeophone seismic spreads to resolve three-dimensional coordinate identifications for seismic reflectors within a volume of an earth formation.

Another object of the present invention is a novel method for displaying three-dimensional seismic data on a two-dimensional display surface.

Further objects and features of the present invention will be fully apparent to those skilled in the art from the specification and appended drawings illustrating certain preferred embodiments in which:

FIG. 10 is a partially block diagram and partially perspective illustration of a plotting apparatus for use in the present invention.

FIG. 11 is a representation of a display of three-dimensional seismic data.

Figure 1:
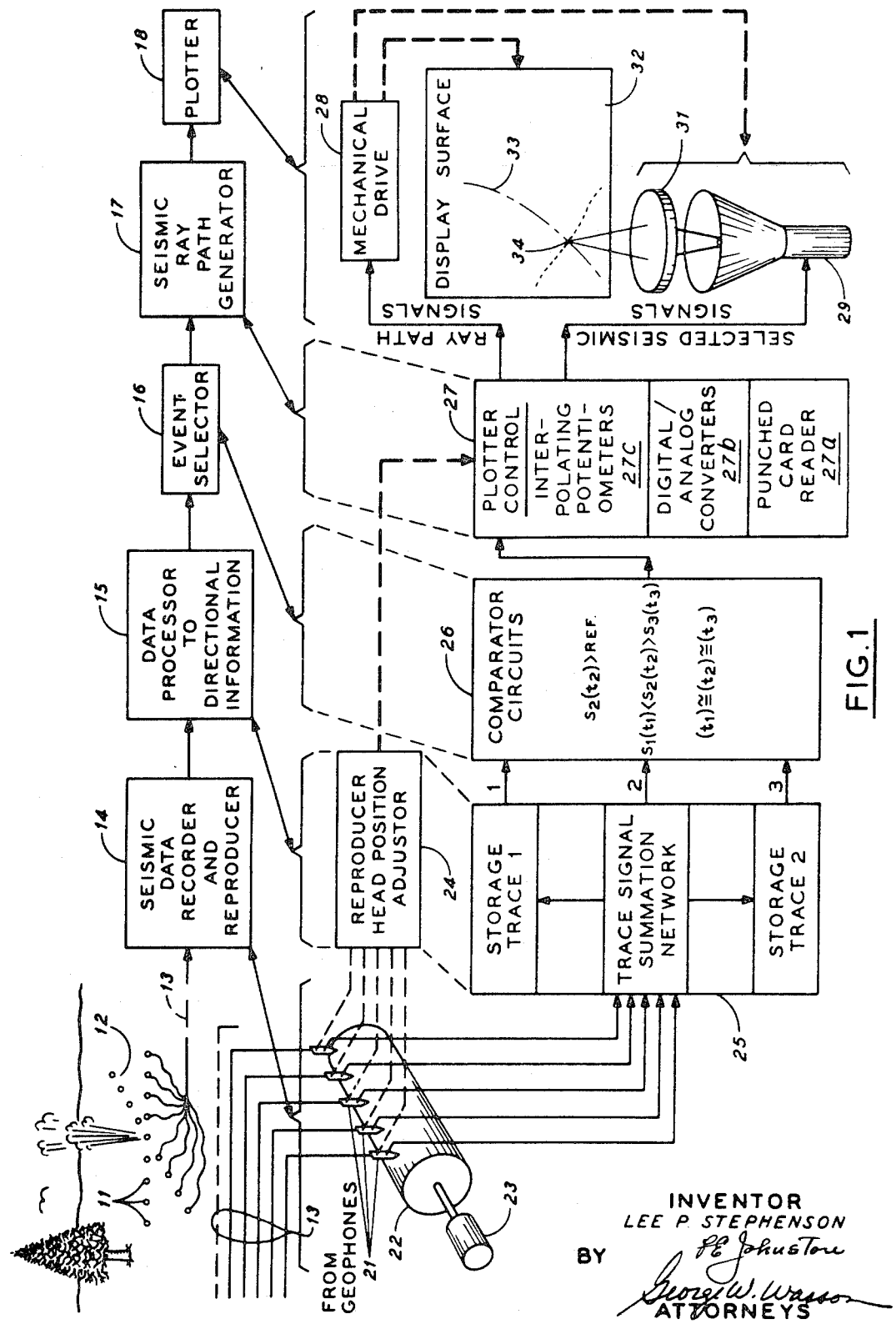
FIG. 1 is a block diagram illustrating the logic applied in performing the method of the present invention.
Figure 2:
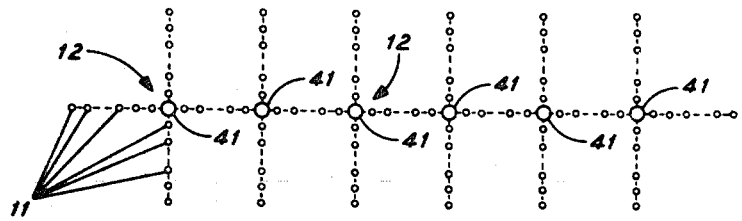
FIGS. 2, 3 and 4 are plan views of geophone positions within surface geophone spread configurations indicating the overlapping relationship of successive spreads employed in a full seismic profile.
Figure 3:
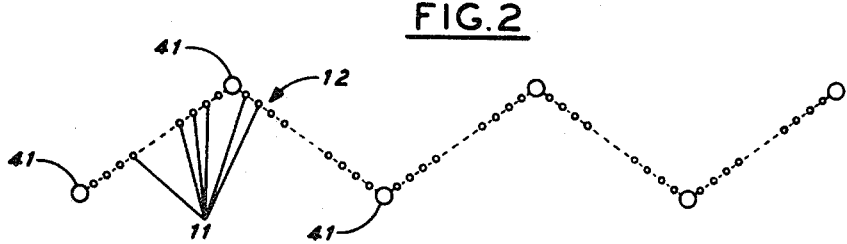
Figure 4:
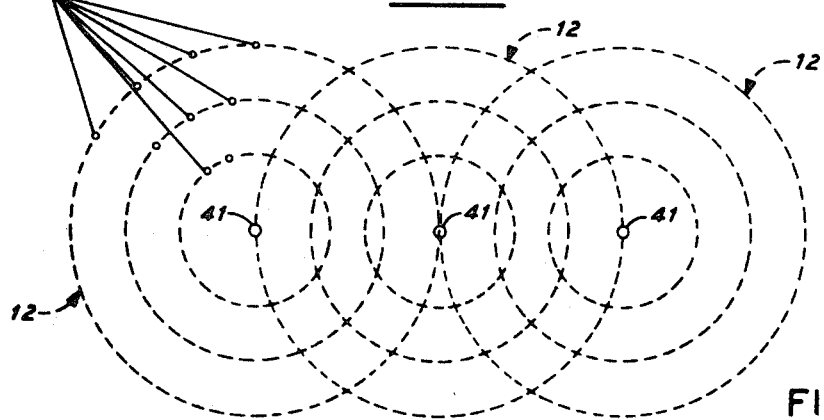

FIG. 1 illustrates the series of logic processes that are performed automatically by the methods and apparatus of the present invention. The plurality of geophones 11 constitute a surface spread configuration 12 connected through individual conductors of cable 13 to a seismic data recorder and a reproducer 14. Other spread configurations are shown in FIGS. 2, 3 and 4 and are described hereinafter. The recorder and reproducer 14 may form two independent parts; one a recorder located at a field location where seismic data are collected and the other a reproducer located at a remote analysis station where suitable record corrections may be applied to the raw field data.

Figure 12:
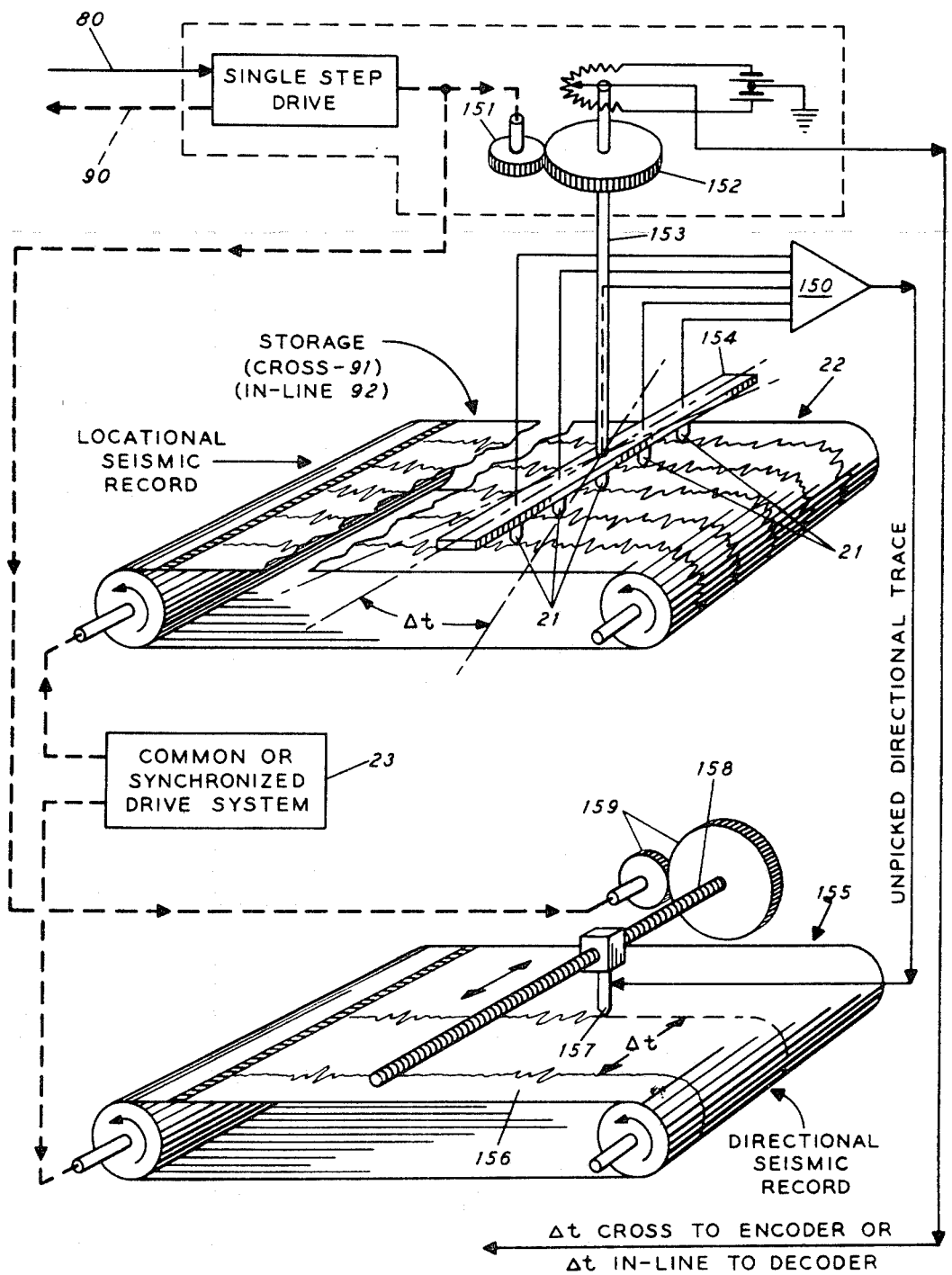
FIG. 12 is a schematic diagram of the process of generating directional seismic traces.
Figure 13:
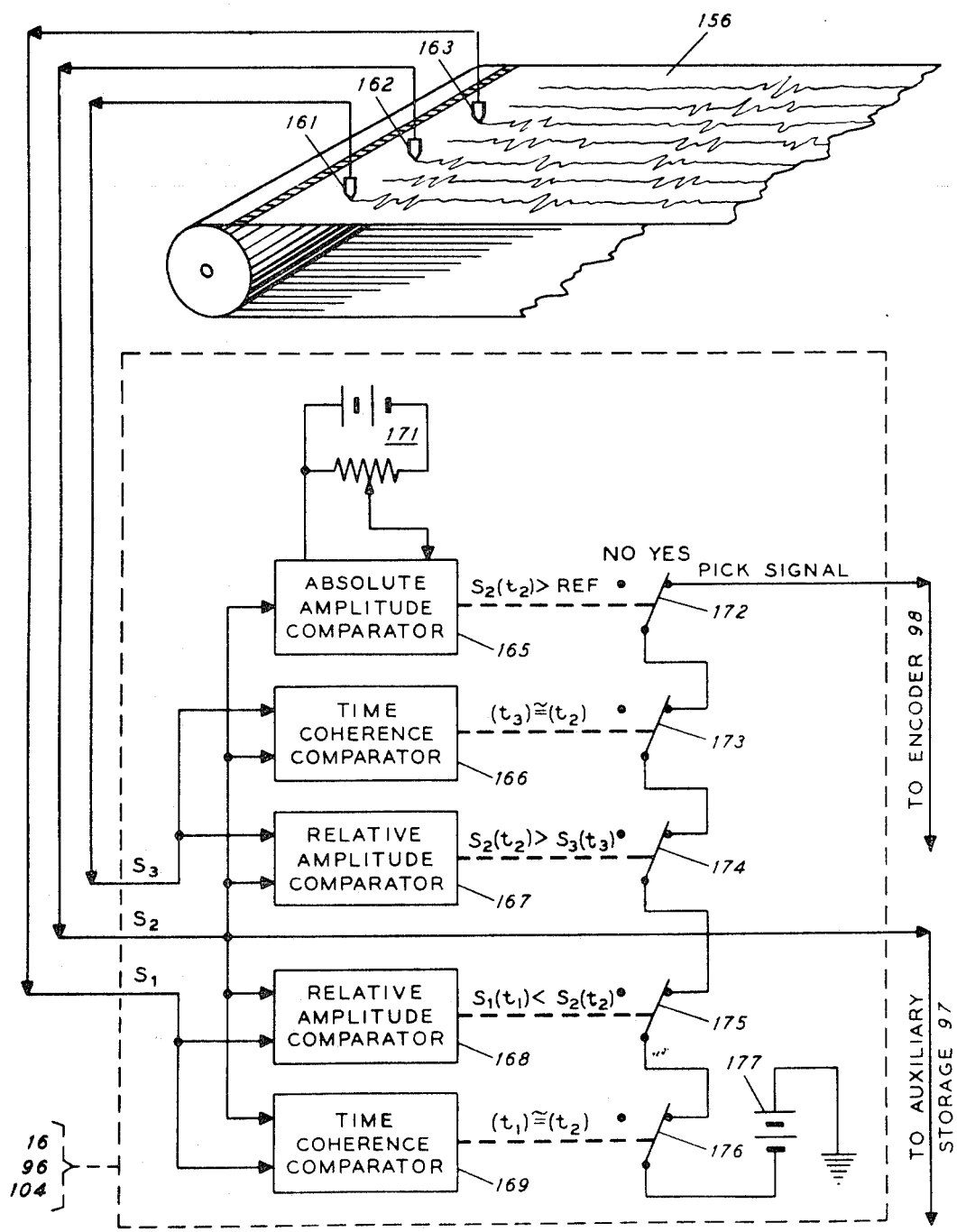
FIG. 13 is a block diagram of an event selector apparatus.

The reproducer supplied locational seismic traces to a data processor 15 where directional seismic information is extracted. The reproducer 14 and processor 15 are shown functionally in FIG. 12 where each is shown as a separate recording system electrically and mechanically cooperating. FIG. 12 will be further described hereinafter. The processor is connected to an event selector 16 where individual seismic events within the directional seismic information are selected in accordance with established selection criteria. The event selector is shown in FIG. 13 and is further described hereinafter. The selector is connected to a seismic ray path generator 17 where coordinates are derived to accomplish the plotting of the selected events within the directional information. The ray path generator is connected to a plotter 18 where a display representing the selected events is produced. The ray path generator and plotter are more fully described in FIGS. 10 and 14.

FIG. 1 also shows more detailed schematic illustrations of the logic processes performed by the simplified block diagram. The cable 13 is shown as a plurality of conductors connected to the pickup heads 21 of a magnetic recording device 22 driven by motor 23. The magnetic recording device 22 functions as the block 14 with heads 21 serving both for recording and reproducing. The heads 21 are adjustable along the circumference of the recording surface. Preferably, each head is independently positionable in accordance with movement instructions from a reproducer head position adjuster 24; however, all heads may be attached to a bar and moved as a unit as illustrated in FIG. 12. The technique of moving individual recording and reproducing heads around the circumference of a recording surface is illustrated in U.S. Pat. No. 2,841,777, F. G. Blake et al., issued July 1, 1958, for "Method for Compensating Seismic Detector Signals for Intersignal Time Variations." When the heads 21 are connected to reproduce recorded signals, the reproduced signals are supplied to a trace signal summation network 25 where the directional seismic traces are produced.

The adjuster 24 and summation network 25 are the elements within the upper block 15. The summation network 25 includes a conventional amplifier circuit 150 (FIG. 12) where all of the individual signals from the multitrace record are combined to produce a composite trace. As the individual traces of the field record are reproduced by reproducing heads 21 at the recording device 22, the instantaneous signals reproduced by all heads are combined in the summation network 25 to produce an algebraic summation of the individual signals across the record. This continuous summation is then employed to produce a trace representing the information appearing across the record, which trace is here referred to as an unpicked directional trace.

Referring now to FIG. 12 as well as FIG. 1, the individual reproducing heads 21 are positioned with respect to each other so that information appearing in the individual traces of the record on recording device 22 and representing reflections arriving from particular angular directions to the geophone array that produced the record will be reproduced in an additive manner. For this purpose the reproducing heads 21 are advanced in uniform succession with respect to each other so that each head is advanced by an additional longitudinal increment with respect to its leftward neighbor. This of course gives the same effect as would be obtained if the record were laid out substantially flat instead of around a drum as in FIG. 1 and if the traces were sampled along a straight line across the record at an angle with respect to the time axis, as shown in FIG. 12. In the method of this invention the successive incremental head displacements are changed after each revolution of the record so that successive revolutions cause the summation trace information to represent successive angular increments across the seismic record. Two of these successive positions are shown in dotted lines in FIG. 12. The different angles as summed by these successive revolutions in turn represent different angles of arrival of the reflection energy in the original recorded seismic information. For purposes of this explanation it is convenient to think of the different head settings on recording device 22 as representing different "emergent angles" of seismic energy, the emergent angles being the angles to the vertical from which the seismic energy seemed to come to the surface as it impinged upon the geophone configuration. The different emergent angles will be identified by $\Delta t$ quantities representing the difference in time between when a signal appears on the first and last trace of the original record. The $\Delta t$ will also identify the incremental head displacements employed in generating the successive composite signals.

In the present invention the different head settings for the different emergent angles are accomplished by the head adjuster 24 in accordance with preprogrammed adjustment information. The adjuster 24 includes apparatus that is set in accordance with the range of emergent angles that are to be searched in processing the record on recording device 22 and the number of increments within that range. To accomplish that purpose the adjuster may constitute a motor-driven cam that is stepped between the range of emergent angles in the prescribed number of increments. The cam operates a mechanical lever that is operatively connected to a means for moving the individual heads 21 to produce the across-the-record alignments of the heads in the successive angular increments. In FIG. 12 this mechanism is shown as a small gear 151 driving a larger gear 152 on a shaft 153 carrying a bar 154 having the reproducing heads 21 supported thereon.

Figure 5:
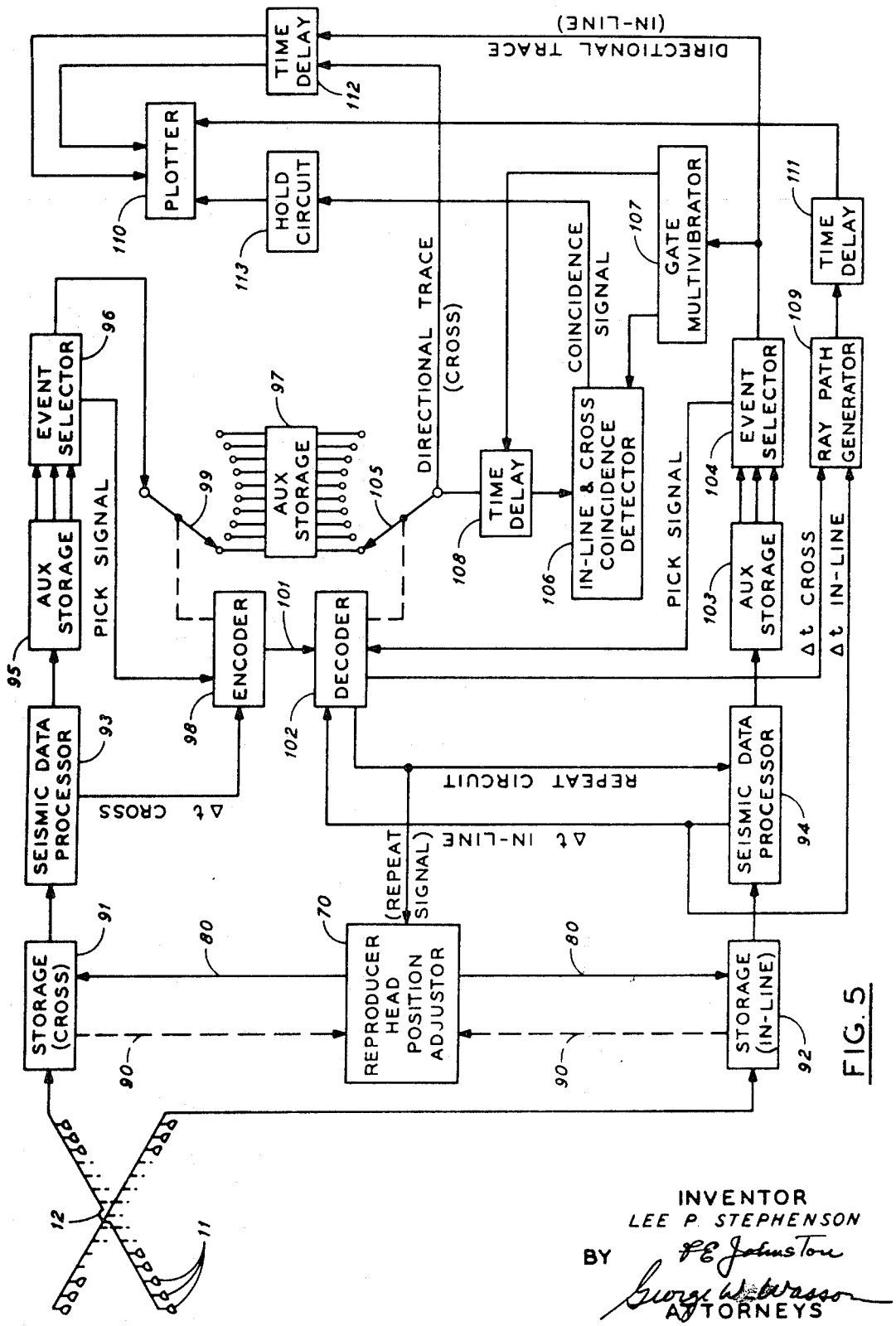
FIG. 5 is a block diagram of an apparatus for processing and plotting three-dimensional seismic data.

The trace summation block 25 of FIG. 1 is intended to illustrate, in a single block form, the operation of the summation amplifier 150 and the auxiliary recording device 155 shown in FIG. 12. As illustrated, the auxiliary storage 155 of FIG. 12 comprises a recording surface 156, a single recording head 157, a mechanism including a worm 158 carrying the head 157 and a gear train 159 driving the worm to move the head 157 longitudinally across the recording surface, and a rotary drive system synchronized with the drive system 23 for the reproducing device 22. Functionally, this auxiliary storage is illustrated in FIG. 5 at 95 and 103 and the auxiliary storage 97 may also be substantially the same apparatus. As each separate summation of the traces on the recording device 22 is produced in the amplifier 150, the summation trace is recorded on the auxiliary storage 155. The position of recording head 157 is controlled in accordance with the $\Delta t$ or angular, across-the-record position of reproducing heads 21. Preferably the summation traces will be recorded beginning with one maximum $\Delta t$ alignment across the record on the reproducer 22 and that summation will be recorded near one edge of the recording surface 156. Each separate summation or directional trace will then be recorded adjacent to the last trace so that across the auxiliary storage 155 there will be the full range of traces representing the range of emergent angles for the energy recorded in the original field seismic record.

After the first few directional traces have been recorded at one side of the recording surface 156 it is possible to begin to interpret and identify the existence of what appear to be true reflections in the recorded traces. The process of selecting reflections along a seismic trace is usually referred to as "picking" and the reflections are generally called "events." Furthermore, if the emergent angles represented by the directions of the recorded directional seismic traces are angularly close enough to each other that the process of summing the signals across the record in the reproducer 22 will cause the reflection to appear as an event in more than one adjacent directional trace, it will then be possible to select the most accurate emergent angle or direction for a particular event by suitable automatic systems. In the process of the present invention the directions searched in the generation of the directional traces are such that an event will appear on at least three adjacent traces and will be represented by the largest signal in the center trace and by reduced power signals in the first and third trace. The number of traces on which the event will appear and the incremental angle is a function of $\Delta t$ between adjacent directional traces and is preprogrammed in accordance with the dominant frequency of the reflection energy in the original record. Where the subsurface geology is complex, many directional traces may be produced, and where the geology is simple, such as where the formations are all horizontal, fewer directions need be searched to distinguish the reflections from the noise.

Since the adjacent directional seismic traces represent summations across the original record in controlled reproducing head alignments, it is possible to automatically select the criterion of events along a particular directional trace by comparing it to the directional traces at each side thereof.

In accordance with the process of the present invention the events along a directional trace are selected in accordance with three criteria. The first criterion is that of absolute amplitude. By this criterion the event along any trace must exceed a reference level in order to be initially considered as an event. The second criterion is relative amplitude. In accordance with this criterion the identified event in a first trace must exceed the amplitude of the same event on directional traces to each side of the first trace. To be the best directional identification for an event the event must appear stronger on the trace being considered than it will appear on the adjacent traces to each side of the direction under consideration. The third criterion is that of time coherence. Time coherence requires that the event must appear on the adjacent traces under consideration at substantially the same time to assure that the comparison is a comparison of the same event on each of the compared traces.

Comparator circuits capable of performing the function of circuits 26 are now known and described in the aforementioned U.S. Pat. No. 3,149,302 of W. W. Klein et al. for "Information Selection Programmer Employing Relative Amplitude, Absolute Amplitude and Time Coherence," assigned to the same assignee as the present application. In that application methods and apparatus were shown for comparing signals along one directional seismic trace with signals occurring at substantially the same time along adjacent directional seismic traces representing seismic energy having the adjacent emergent angles. FIG. 1 illustrates the application of these comparing circuits in the logic of the present invention in block 26; the actual operation is more fully shown in FIG. 13. It should be quite evident that when one trace ($S_2$) representing one emergent angle is compared to the adjacent traces ($S_1$ and $S_3$) representing the adjacent emergent angles, the most accurate identification of a direction to a subsurface reflector can be selected when the signal representing a reflection in the center trace (1) exceeds a prescribed amplitude (absolute amplitude or $S_2(t_2) >$ REF.) where $S_2(t_2)$ is the signal at time $t_2$ on trace 2 and REF. is a reference voltage, (2) exceeds the amplitude of signals representing the same reflection in both of the adjacent traces [relative amplitude $S_1(t_1) > S_2(t_2) > S_3(t_3)$], and (3) when all comparisons are made at the same time and require the same polarity of signal along each trace [time and phase coherence $(t_1) \cong (t_2) \cong (t_3)$].

As shown in FIG. 13, the individual directional traces along the recording surface 156 are reproduced by separate reproducing heads 161, 162 and 163 and supplied as signals $S_1$, $S_2$, and $S_3$, respectively, to the event selector enclosed within the dotted lines. This event selector is block 16 of FIG. 1 and blocks 96 and 104 of FIG. 5. The process of reproducing the traces $S_1$, $S_2$ and $S_3$ may be done as a separate operation of the auxiliary recording device 155 or, as has previously been described, may be performed after a suitable number of directional traces have been produced for the auxiliary storage. In the process of event selection the instantaneous signals along one entire trace of the auxiliary record will be reproduced and compared to its adjacent traces as the auxiliary storage completes one revolution. After the revolution has been completed the individual heads 161, 162 and 163 will be moved laterally across the auxiliary storage (by a mechanism not herein shown) to cause the same event selection procedure to be applied to the next directional trace and its adjacent traces representing the next emergent angle for recorded reflection energy.

Within the event selector of FIG. 13, the trace being processed, $S_2$, is supplied to an absolute amplitude comparator 165, to a first time coherence comparator 166, to a first relative amplitude comparator 167, to a second relative amplitude comparator 168, and to a second time coherence comparator 169. Adjacent trace 1 and its signals $S_1$ are supplied to the second relative amplitude comparator 168 and the second time coherence comparator 169. Adjacent trace 3 and its signals $S_3$ are supplied to the first time coherence comparator 166 and the first relative amplitude comparator 167. A reference signal from an adjustable source 171 is supplied to the absolute amplitude comparator 165.

The electronic circuits for performing the comparisons within the blocks of FIG. 13 are well known in the electronic arts and function to compare two input signals and to supply an output signal or to perform an operation when the comparison satisfies an established criterion. In the case of the event selector of FIG. 13, for instance, in the absolute amplitude comparator 165 the comparator compares the signal $S_2$ to the reference signal from source 171 and, when $S_2$ is greater than the reference, the comparator causes contacts 172 to be closed. A similar operation is performed in each of the other comparators to operate contacts 173, 174, 175 and 176. The contacts of the separate switches are connected in series and supplied from a source 177 so that when all contacts are in the closed position at the same time, a signal will be supplied as an output from the event selector along with the directional trace being processed.

In the procedure illustrated in FIG. 1, the pick signal and the events along the trace being processed are supplied to the plotter control 27. The pick signal is used to select those events that will be passed through the plotter control 27 in the FIG. 1 process. The pick signal is also illustrated in FIG. 5 where it is supplied to an encoder 98 for controlling the storage of signals in auxiliary storage 97 and for storage of the $\Delta t$ quantity identifying the trace being processed and stored.

While the process of event selection is being performed in the comparator circuits 26, the seismic ray path generator 17 constituting the plotter control 27 and its associated circuits is generating the ray path of the seismic energy having the emergent angle represented by the $\Delta t$ of the alignment of the reproducing heads 21. The control 27 determines the X and Z coordinates of positions along directional seismic ray paths followed by seismic energy into the earth formation and back to the surface array from a subsurface reflector. The ray path being searched is initially determined by the alignment of the reproducing head positions or $\Delta t$ quantities from the adjuster 24 where $\Delta t$ is the incremental difference between adjacent reproducing heads across the original seismic record. The alignment of the heads also identifies the emergent angle of reflection energy being considered.

It is recognized in theoretical geophysics that if the emergent angle of a seismic wave is specified and if the seismic wave velocity is known as a function of depth in the subsurface then the entire subsurface path may be calculated along which that particular seismic wave traveled. As a practical fact, the way in which the seismic wave velocity varies with depth is never known exactly but useful approximate variations can be assumed. The simplest type of velocity variation that can be assumed is a linear variation, with the seismic wave velocity increasing as a linear function of depth. This type of variation gives rise to curved ray paths of the sort indicated in FIG. 1. (Numerical computation of curved ray paths under the assumption of linear velocity variation is described in "-Seismic Prospecting for Oil" by C. H. Dix, pp. 143 to 149, Harper, N.Y., 1952.) It is along the general direction of such ray paths that the oscillatory data picked up by heads 21 are to be plotted. So in the plotting of the data, it is necessary for the plotter control 27 to generate the curved ray paths 33, at the same time that data are being transmitted from heads 21, through the intermediate apparatus shown in FIG. 5, to the deflecting circuits of cathode-ray tube 29.

Figure 14:
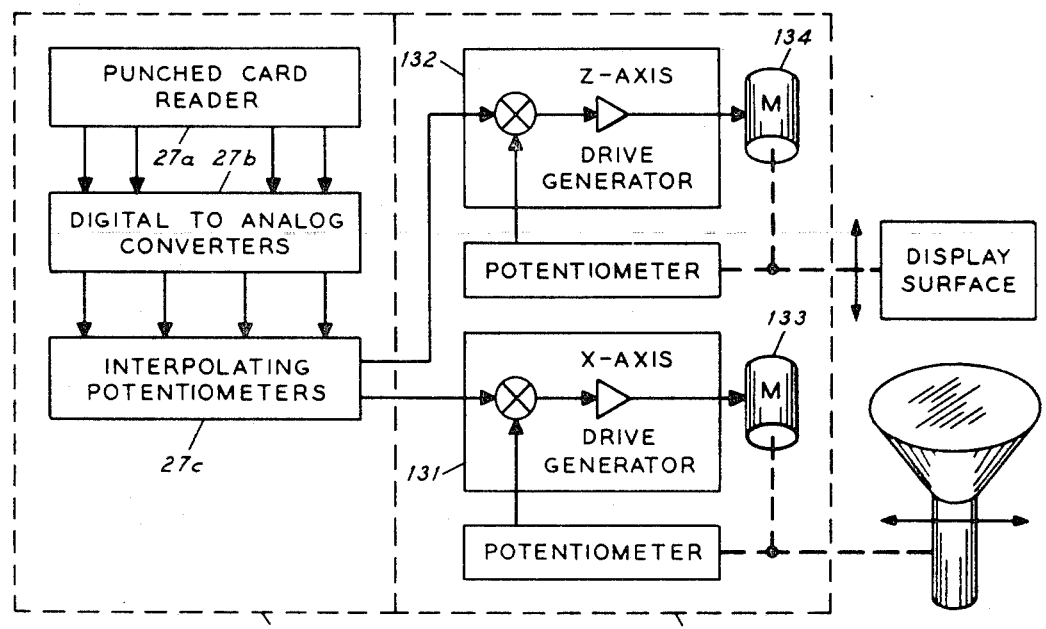
FIG. 14 is a block diagram of a ray path generator and the energization circuits for controlling of motion of the display apparatus of the present invention.

The plotter control 27 may include several different forms of ray path generators for producing ray paths 33. The particular kind of ray path generator indicated schematically in FIGS. 1 and 14 was the kind actually used in an early embodiment of a portion of the present invention. FIG. 14 is a more detailed schematic of the ray path generating apparatus and constitutes the equipment performing the function of block 109 of FIG. 5 and FIG. 10.

Ray path generator 27 (and 109) includes a punched card reader 27a, capable of sensing the holes on a standard punched card. A different card is selected, either by hand or by automatic selection in accordance with signals from reproducer head position adjuster 24 along the dotted line as shown in FIG. 1, and inserted into card reader 27a for each different setting of the heads 21, and therefore, correspondingly, for each different emergent angle of the ray paths 33 to be plotted. The selection of a punched card is done in accordance with the $\Delta t$ signal supplied from the adjuster 24, a separate card having been punched for each $\Delta t$ to be considered. Along with the $\Delta t$ signal, the plotter control is supplied with a time signal or rotation position signal from the reproducer 22 to establish the elapsed time along the time axis of the seismic record being processed. That information may be supplied with the signals from the comparator circuits 26.

The punched holes on any one card represent a number of different values, for examples, 40, of the horizontal coordinate $x$ and 40 correspondingly different values of $z$, so that together they represent 40 points along one of the ray paths 33. Consider only one of the coordinates at a time, say the $x$ coordinate. The punched card reader employs the signal signifying the angle of rotation of the recording device 22 and therefore signifying the wave travel time represented by that angle of rotation. The wave travel time determines what part of the punched card is to be read. As indicated hereinbefore, the card carries 40 sets of holes for the $x$ coordinate corresponding to 40 discrete time values. At any given actual time, not precisely equal to one of those 40 discrete values, the card reader is sensing at least two groups of holes, one set corresponding to the discrete time earlier than the actual time, and the other corresponding to the discrete time later than the actual time. The two sets of holes are transformed into two voltages by digital-to-analog converters 27b and these voltages are applied to the proper taps on one of two 40-tap interpolating potentiometers 27c, each of whose taps corresponds to one of the 40 discrete time values represented by the sets of holes in the cards. The arm of the interpolating potentiometer, as it moves along the potentiometer windings at a uniform rate (corresponding to the rotation rate of recording device 22) senses a voltage intermediate between the voltages at the taps spanning its particular position, and as the potentiometer arm moves the voltage therefore varies in an effectively continuous manner, always smoothly interpolating between the voltages applied to its taps by the digital-to-analog converters 27b.

In one embodiment of the present invention, three sets of x holes could be sensed by the card reader simultaneously, and three sets of z holes could also be sensed simultaneously. Correspondingly, there were three individual digital-to-analog converters applying voltages to the x-interpolating potentiometer and three individual digital-to-analog converters applying voltages to the y-interpolating potentiometer. This six-unit arrangement ensured that the interpolating potentiometers would always be activated at least one tap ahead of the arm position, and usually two taps ahead.

The plotter control 27 thus supplies continuously two voltages, one of which is proportional to the desired x coordinate, and the other of which is proportional to the desired z coordinate of a ray path. The voltages themselves may be called, for convenience, simply, the x voltage and the z voltage. These voltages are now used to determine the motions of the plotting apparatus.

The x voltage and the z voltage are fed to the mechanical drive 28 which contains two error detectors and two amplifiers. Considering again just the x coordinate, the x voltage coming from the plotter control 27 goes to one of the input terminals of an error detector. Into the other input terminal of error detector is fed a voltage from a potentiometer which voltage is an indication of the position of the shaft of a motor causing movement in the x direction (such as motor 133, FIG. 10), and in turn an indication of the x position of the plotting board 32. Any difference between the two voltages fed into error detector causes the output of error detector to actuate a power amplifier which in turn actuates the motor until the error detector no longer senses a difference between its two input voltages. Then the cathode-ray tube 29 must necessarily be in the proper x position.

In an exactly similar manner, the z voltage fed into mechanical drive 28 energizes a motor (such as motor 134, FIG. 10) and it establishes a voltage from a potentiometer to indicate the z position of the cathode-ray tube 29. The motor causes the cathode-ray tube to be moved to the proper position.

The plotter control 27 provides two forms of output information, one constituting the coordinates of positions along a generated ray path for energization of a mechanical drive element 28, and the other constituting the information for energization of a device for converting electrical signals into visible signals for display. The converter as shown employs an oscilloscope 29 provided with appropriate lensing arrangements 31 for directing an image of an electron beam of the oscilloscope toward a display surface 32 to produce both the ray path plot 33 and the superimposed indications 34 of the selected seismic events. The output of the mechanical drive 28 is connected to both the display surface and the oscilloscope and provides for part of the necessary relative movement. In the display of FIG. 1, dip bars are shown; however, other forms for the display may also be used. In FIG. 10 a more complete disclosure of the plotting technique is shown and described. Reference should be had to that figure for the technique of display as well as to the aforementioned U.S. Pat. No. 3,149,303 of W. W. Klein et al. for "Seismic Cross Section Plotter," assigned to the same assignee as the present application.

PROCESSING MULTIRECORD DATA

The foregoing specification has considered the analysis and processing of seismic data from a single seismic record and the eventual plotting of the data in that record along representations of a ray path on a display surface. In the initial discussion in this application the shortcomings of single-record analysis have been described. This specification will now describe how multirecord data will be processed to select seismic events within the multirecord data, how the selected events will be correlated to identify data representing the same events and how the correlated data will be displayed along representations of generated ray paths passing into a three-dimensional volume for projection onto a two-dimensional display surface. To accomplish this display it is necessary to process parts of the multirecord data separately and to store part of the processed data for correlation later with other processed data. The orderly processing of this data will now be described.

GEOPHONE PATTERNS

In FIGS. 2, 3 and 4, three patterns for geophone spread configurations are illustrated FIG. 2 illustrates a series of in-line and cross-geophone spread configurations 12 with a plurality of geophones 11 forming repeating in-line and cross spreads. This spread configuration may be used for energization of the block diagram of FIG. 1. The shot point 41 is preferably located at the intersection of the in-line and cross spreads. Repeating spread configurations overlap each other so that the spacing between successive cross spreads will be half the length of the in-line spread. This overlapping provides for continuous subsurface coverage as well as continuous display coverage. Shot points at other than the center of the crossed spreads may be employed but will require additional data processing beyond that described in the present invention.

FIG. 3 illustrates several spreads 12 in a zigzag spread configuration with shot points 41 located at the end of each line of the zigzag form. The survey line, when a spread configuration of this form is employed, is generally between and parallel to the lines of the shot points. This configuration eliminates the need for overlapping spreads as in FIG. 2 but requires some transposition of the seismic data when the records are processed. The FIG. 3 spread configuration may also be used for energization of the FIG. 1 block diagram.

FIG. 4 illustrates a circular geophone spread configuration 12 with a plurality of geophones 11 positioned in concentric circular patterns around a shot point 41. Adjacent spread configurations overlap a full radius of the previous circular pattern to provide for continuous subsurface coverage. The data received by this spread configuration must be selectively combined to provide in-line and cross-spread information. The spread configuration has an advantage over the FIG. 2 and FIG. 3 forms by providing better signal-to-noise ratios and better directionality.

DATA PROCESSING

FIG. 5 is a block diagram of an automatic apparatus for performing the multirecord data processing method of the present invention. In this apparatus seismic data from an in-line and cross-geophone spread configuration is processed to derive three-dimensional information. Reproducer head position adjuster 70 directs the automatic operation of the reproducer apparatus with control to the separate channels through connection 80 and mechanical response back to the control through connectors 90. Connection 80 carries signals initiating operation of the record processing as illustrated in FIGS. 1 and 12 and institutes the incremental adjustments of the reproducer heads associated with storage devices 91 and 92 while connectors 90 interlock the two storage devices to provide for sequential operation. The adjuster 70 may take the form of a stepping switch supplying a command on conductor 80 to a single-step drive as illustrated in FIG. 12, or other similar programmed device supplying a sequence of signals as contemplated in the sonograph equipment described on pages 825–828, and particularly on page 827, of *Exploration Geophysics* by J. J. Jakosky, Trija Publishing Company, Los Angeles, California, 1950. The system described there is a mechanical drive for the adjustment of magnetic pickup heads as illustrated in the U.S. Pat. No. 2,427,421 to F. Rieber, for APPARATUS AND METHOD FOR MAKING AND ANALYZING GEOPHYSICAL RECORDS, issued Sept. 16, 1947. The stepping switch continues to supply its command until a signal on connector 90 indicates that all the desired head positions have been searched. As illustrated the cross geophones are connected to a cross record storage 91 and the in-line geophones are connected to an in-line seismic record storage 92. The in-line and cross storage devices which are preferably magnetic tape recording and reproducing devices are connected to their respective seismic data processors 93 and 94 where the seismic data is processed to convert the recorded locational seismic traces into traces of directional seismic information.

CROSS RECORD

In accordance with the present invention, the cross record is first processed in the manner previously described to locate and identify those signals on directional traces that appear to identify seismic events. The procedure is first to generate the cross-directional traces by adjusting the relative positions of the reproducing heads and by summing the signals reproduced from the cross record (see FIG. 12). The reproducing heads should here be considered as part of the storage 91 while the seismic data processor 93 includes the summation circuits and trace identification equipment. As the directional traces are generated they are stored in the auxiliary storage 95 until either a full record has been collected or until at least enough records are collected to permit automatic event selection in selector 96, as described with respect to FIG. 13. When an event is picked along a directional trace, that trace is retained in an auxiliary storage 97 and the $\Delta t$ identification of that directional trace is passed through encoder 98. The $\Delta t$ quantity is suitable for storage in any of well-known reproducible storage forms; that is, as a digital quantity on punched tape, punched cards or as an analog signal in a magnetic storage system. As will be seen later in this specification, the form of the signal from encoder 98 is not critical so long as the quantity represented by the signal may be reproduced for comparison to other quantities produced in the processing of the in-line record. As illustrated in FIG. 5, the signals to the encoder are mechanically coordinated with a storage channel in auxiliary storage 97.

Figure 15:
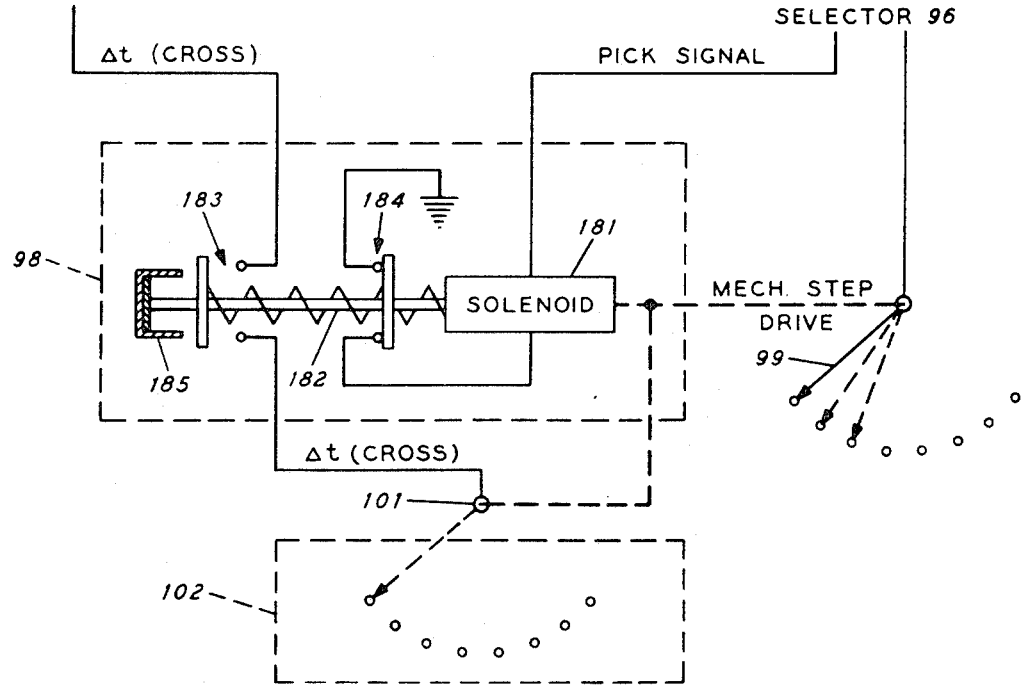
FIG. 15 is a schematic diagram of the solenoid switch 98.

As illustrated in FIG. 15, the encoder 98 may take the form of solenoid-operated contacts and a mechanical drive system. The solenoid 181 is energized by the pick signal from the event selector whenever the contacts 172 through 176 in event selector 96 and shown in FIG. 13 are closed simultaneously. Energization of the solenoid causes spring-biased rod 182 to be moved to close normally open contacts 183 and to open normally closed contacts 184 as well as to cause a movement that will result in delayed mechanical stepping of contactor 99 of auxiliary storage 97. Contacts 183 carry the $\Delta t$ quantity representing the trace being processed through the encoder whenever an event is picked. Contacts 184 are provided to interrupt energization of the solenoid after it has once been operated and the one-way time delay dashpot 185 restricts closing of contacts 184 so that the solenoid will operate once for each revolution of the record reproducer 22. The actual mechanism employed in encoder 98 is not critical; all that is necessary is that the $\Delta t$ signal be supplied through the encoder and that the contactor 99 be moved to the next channel only after an event has been identified and after the entire trace has been processed.

The decision to store any particular cross-directional trace and its $\Delta t$ identification is established with the occurrence of a pick signal from the selector 96. The pick signal is supplied whenever a selectable event is identified, one pick signal per trace is adequate to retain the full trace. Each trace as it is being processed is supplied to the multichannel auxiliary storage 97 where it can be retained as complete traces for later correlation with other complete traces. Multichannel auxiliary storage 97 may constitute a magnetic storage device providing capacity for a number of complete directional traces with access to the stored traces on appropriate command to the identification ($\Delta t$) of the stored traces. After a trace has been interrogated in the event selector 96, the encoder controls the position of contactor 99 based upon the decisions during the previous event selection process; if no events were selected, the contactor 99 remains on the same channel and the next trace from event selector 96 is recorded where the last record was recorded; if an event is selected during a trace interrogation, the contactor is moved to the next channel of the auxiliary storage after the full trace has been recorded. The $\Delta t$ angle information identifies the stored directional traces and its location.

Whenever a decision is made for operation of the encoder 98 the angle information supplied form the processor 93 is fed to a decoder 102 through conductor 101. Decoder 102 constitutes a storage unit capable of holding the identification ($\Delta t$) of the complete traces stored in auxiliary storage 97. The decoder retains the angle information in any suitable form for later comparison to angle information from the in-line record processor 94 in a manner to be described hereinafter.

So far, the data processing of the present invention has combined a first group of seismic signal traces in a plurality of different time-related combinations to produce a first group of directional seismic traces.

IN-LINE RECORD

After the entire cross record has been processed and the directional traces therein that have been found to contain selected events have been stored on the auxiliary storage 97, the adjuster 70 is advised, by a suitable signal on connector 90, that the cross record has been processed and that processing of the in-line record may be started. The appropriate signal produced as by closure of a limit switch as the pickup heads are moved to one end limit is supplied on conductor 80 to the storage 92 to cause the heads of the storage to be positioned for producing the first in-line directional trace.

The in-line locational traces are reproduced from the storage 92 and supplied to the processor 94 were they are combined to generate the in-line directional traces. Processor 94 supplies directional seismic traces to auxiliary storage 103 in the manner described with respect to FIG. 12. After all of the directional traces are produced or preferably after a sufficient number of directional traces of the in-line record are processed to permit event selection, the event selector 104 proceeds to interrogate an in-line directional trace to determine if it contains a selectable event. The process of event selection in selector 104 is the same as has been described with respect to FIG. 13; however, the identification of an event on the trace being processed in the selector 104 initiates a series of decisions that will result in the eventual identification of a common event on both the in-line record and the cross record. This series of events will now be described.

The identification of a pickable event in the event selector 104 causes a pick signal to be transmitted to the decoder 102. As previously described, the decoder 102 was supplied with $\Delta t$ cross information on conductor 101 from the encoder 98. Each of the $\Delta t$ cross signals supplied to the decoder 102 was stored in a reproducible form for review with respect to similar signals generated during the processing of the in-line record. Along with the pick signal from selector 104, the decoder 102 is supplied with $\Delta t$ in-line information from the processor 94. This $\Delta t$ in-line information is in the same form as the reproducible $\Delta t$ cross signals previously recorded in the decoder 102. When a pick signal is supplied from the event selector 104, the decoder 102 causes the $\Delta t$ in-line information then being supplied from processor 94 to be compared to each of the stored $\Delta t$ cross signals to identify by that comparison the stored cross traces in auxiliary storage 97 that could contain an event common with the event on the trace being processed and interrogated in the selector 104. For each comparison of the in-line trace with a separate cross trace the in-line trace will be separately reproduced and compared to a reproduction of the trace from the auxiliary storage 97.

The simplest manner of reproducing the in-line record is to supply a repeat signal from the decoder 102 to the processor 94 to continue the generation of the same $\Delta t$ in-line trace until each $\Delta t$ cross trace has been reviewed. Alternatively, the repeat signal may go to auxiliary storage 103 to repeat the reproduction of a certain $\Delta t$ in-line trace. Adjuster 70 must therefore be supplied with a repeat signal to discontinue movement of the reproducing heads in storage 92.

DECODER

It will be helpful now to consider the operation of the decoder 102 and the function it performs in the selection of events for plotting in the three-dimensional seismic data processing method of the present invention. Decoder 102 generally includes storage circuits, solenoid switches and comparator circuits. For the purpose of this explanation reference should be had to FIGS. 5, 7 and 16.

Figure 7:
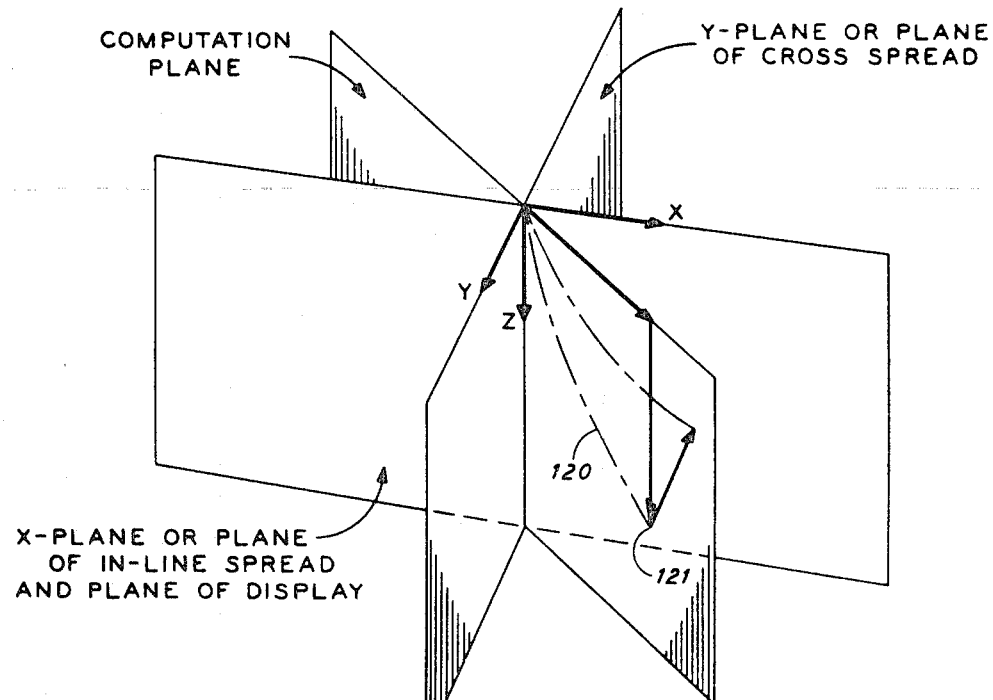
FIG. 7 is a graphic illustration of the relationship between the computation plane, a selected event within that plane and the representation of that event in a display plane.

Before describing the illustration of FIG. 7, it is helpful to recall the process to be followed in identifying seismic reflectors within a three-dimensional volume. The selected and stored directional traces produced by processing the cross-seismic record identify possible ray paths wherein reflectors may lie. Processing of the in-line seismic record also identifies events within possible ray paths. These possible ray paths are then correlated to identify common events on a common ray path. Part of the function of the decoder 102 is to review the stored $\Delta t$ cross information along with the $\Delta t$ in-line information identifying an in-line directional trace that contains a pickable event to determine whether the two $\Delta t$ quantities can identify ray paths in a common plane. This review and decision is done in accordance with the following relationship:

$$(\Delta t \text{ comp})^2 = (\Delta t \text{ in-line})^2 + (\Delta t \text{ cross})^2 \quad (2)$$

Where ($\Delta t$ in-line) is the time difference between reflection signal detection at the first and the last geophone in the in-line spread for a particular directional trace seismic record summation;

($\Delta t$ cross) is a similar time for a cross-record directional trace; and ($\Delta t$ comp) is the effective time difference in signal reception at a geophone spread in the computation plane. This equation and its derivation has been stated by C. H. Dix ("Seismic Prospecting for Oil," Harper & Brothers, 1952, at page 164). The quantities $\Delta t$ in-line and $\Delta t$ cross are supplied to the decoder 102 by the processors 94 and 93, respectively.

To simplify the performance of this preliminary decision, the equation is rewritten in another form so that the circuits of the decoder may be preprogrammed to assign a constant quantity for ($\Delta t$ comp). ($\Delta t$ comp) may be adjusted to a constant because it will then establish the angles with respect to the surface through which the present process will search. Any angle outside of this preset limit is of little or no interest and may be excluded. The in-line data processor 94 has been programmed by adjuster 70 to search the in-line record in a plurality of $\Delta t$ quantities preselected for directional trace coverage of the earth volume being surveyed and each programmed $\Delta t$ in-line quantity can then be considered as a fixed quantity for the period of comparison to the $\Delta t$ cross quantities. If the equation (2) is then rewritten as:

$$(\Delta t \text{ cross})^2 = C_1 - C_2 \quad (3)$$

where $C_1$ is a constant equal to the maximum ($\Delta t$ comp)$^2$ to be considered and $C_2$ is a constant equal to ($\Delta t$ in-hine)$^2$ being generated, the only variable quantity will be the reproduced $\Delta t$ cross quantity. The decoder 102 then performs a review of the stored ($\Delta t$ cross) quantities identifying the event-selected, directional seismic traces from the processed cross-seismic record in accordance with equation (3). When a stored, cross-directional trace identified by its ($\Delta t$ cross) could include a ray path common to a possible ray path for the directional trace being processed by the in-line processor, then that stored $\Delta t$ cross trace is supplied to the coincidence detector 106 along with the in-line trace being processed. The circuit elements within the decoder 102 perform this equation determination for each $\Delta t$ cross, event-selected, directional seismic trace stored in the auxiliary storage 97 and only those stored traces that could include a common event with the in-line directional trace, within the assigned ($\Delta t$ comp) quantity, are further processed in the coincidence detector.

By performing the above preliminary determination, the present method of identifying three-dimensional seismic information is simplified at least to the extent that some less probable portions of the volume being surveyed are excluded. By assigning a constant to the quantity ($\Delta t$ comp)$^2$, a preliminary decision has been made as to what resolved time differentials will be searched in the computation plane. Any ($\Delta t$ comp)$^2$ quantity that exceeds the prescribed constant is automatically excluded while all others will be searched for common events.

Figure 16:
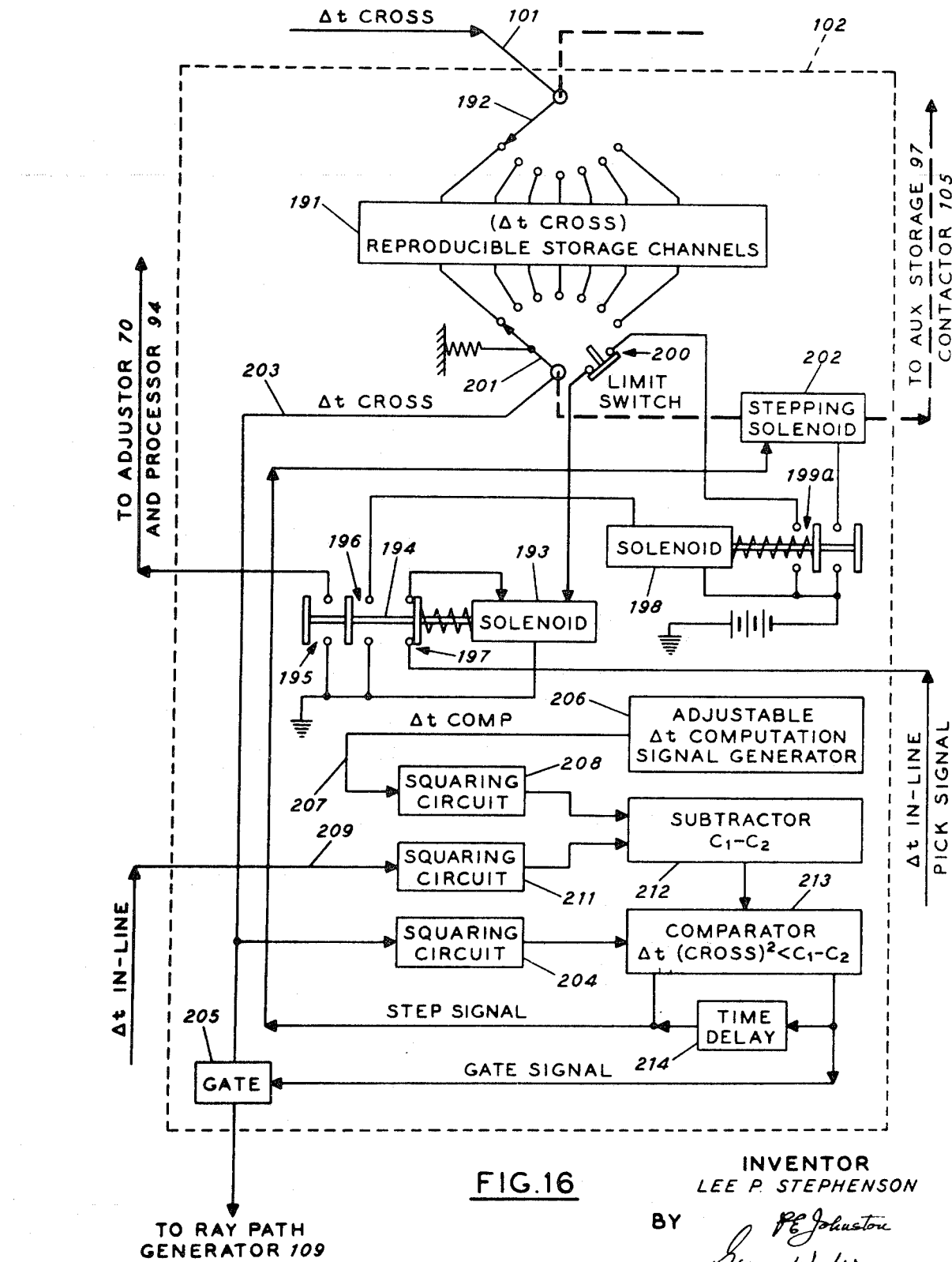
FIG. 16 is a schematic diagram of the storage, solenoid switch and comparator 102.

FIG. 16 is a block diagram illustration of the circuit elements contained within the decoder 102. Supplied to the decoder 102 on conductor 101 are the $\Delta t$ cross quantities from encoder 98 and these quantities are applied to separate reproducible channels of a reproducible storage device 191 by the mechanical movement of a contactor arm 192 in a series of discrete steps caused by energization of solenoid 181 within the encoder 98. The storage 191 will therefore contain all of the $\Delta t$ cross quantities that identify the individual cross-directional traces that contain pickable events and that are recorded in the auxiliary storage 97. As has been previously explained, the form of the stored $\Delta t$ cross quantity is not critical; all that is necessary is that the quantity be reproducible for comparison to the $\Delta t$ in-line information that will be supplied to the decoder 102.

Also included in the decoder 102 is a solenoid 193 actuated by the pick signal from event selector 104. The solenoid includes movable contacts and a mechanical drive system similar to that shown in FIG. 15 for the encoder 98. Energization of the solenoid 193 causes spring-biased rod 194 to be moved to close normally open contacts 195, to close normally open contacts 196 and to open normally closed contacts 197 as well as to initiate operations that will result in mechanical stepping of contactor 105 of auxiliary storage 97. The circuit through contacts 197 is opened once the solenoid has been operated to ensure that only one operation of the solenoid need occur for each directional trace processed in the event selector 104. Contacts 196 will close the circuit to a second solenoid 198 having contacts 199a that provide a "hold" circuit for solenoid 193 through limit switch 200, and contacts 199b that complete the energization circuit for a stepping solenoid 202. Energization of solenoid 202 causes step-by-step movement of contactor 201 (one step with each energization of the solenoid) so as to reproduce in order all of the $\Delta t$ cross quantities stored in separate channels of the storage 191. Contacts 195 are provided to close a repeat circuit to the adjuster 70 and processor 94 to cause the repeat generation of the in-line directional trace presently under consideration. The energization of the stepping solenoid 202 causes stepping movement of contactor 105 of auxiliary storage 97 and contactor 201 of the storage 191 until all channels in storage 97 and 191 have been reproduced. While this repeat operation of the stepping switch continues, a hold signal is supplied through contacts 199a to the solenoid 193 to maintain the contacts 197 open and the contacts 195 and 196 closed. When all channels have been reproduced, limit switch 200 is opened and contactor 201 is returned as by spring bias to the first storage channel.

Each of the separate $\Delta t$ cross quantities reproduced from the storage 191 is supplied on conductor 203 to a squaring circuit 204 and a gate 205. A preadjusted maximum $\Delta t$ computation signal is supplied from signal generator 206 on conductor 207 to a squaring circuit 208. A $\Delta t$ in-line signal is supplied on conductor 209 to squaring circuit 211. The $\Delta t$ in-line signal and the adjustable $\Delta t$ comp signal are supplied continuously to their squaring circuits while the signal to squaring circuit 204 is the signal separately reproduced from each channel of the storage 191.

The quantities from the squaring circuits 208 and 211 are supplied to a subtractor 212 and that from squaring circuit 204 to a comparator 213 for performing the decision as stated in equation (3). The two inputs to the comparator are the ($\Delta t$ cross)$^2$ and the $C_1-C_2$ from the subtractor. The output signals from the comparator are a gate signal to gate 205 to permit the $\Delta t$ cross quantity to be passed to a ray path generator 109 and a step signal to solenoid 202. The step signal may be substantially instantaneous as when the equation (3) is not satisfied in comparator 213 or a delayed step signal when the equation is satisfied. The delay through time delay 214 is for the length of time to permit the complete reproduction of a stored $\Delta t$ cross trace from auxiliary storage 97. When all of the $\Delta t$ cross quantities have been supplied from the storage 191 the hold circuit through contacts 199a will be opened and solenoid 198 will be deenergized as contacts 196 are opened. The opening of contacts 195 opens the circuit for the repeat signal so that a new directional trace will be generated from storage 92 and processed through the event selector 104. When the next pick signal is supplied to the solenoid 193 the foregoing procedure will be fully repeated so that the new $\Delta t$ in-line signal will be compared to each of the stored $\Delta t$ cross signals to control the operation of gate 205.

The process performed by the decoder is therefore to identify those stored $\Delta$cross traces that could include a common event with the directional in-line trace under consideration and to supply those traces and the in-line trace to a coincidence detector so as to permit the identification of common events on the two traces.

COINCIDENCE DETECTOR

When common events could be present on both an in-line and a cross-directional trace, as resolved by the operation of decoder 102, contactor 105 supplies a stored trace from auxiliary storage 97 for comparison to the in-line directional trace being processed. Both traces are supplied to a coincidence detector 106 where the existence of a common event on the in-line record and cross record is detected by the process illustrated in the waveform diagrams of FIG. 6.

Figure 6:
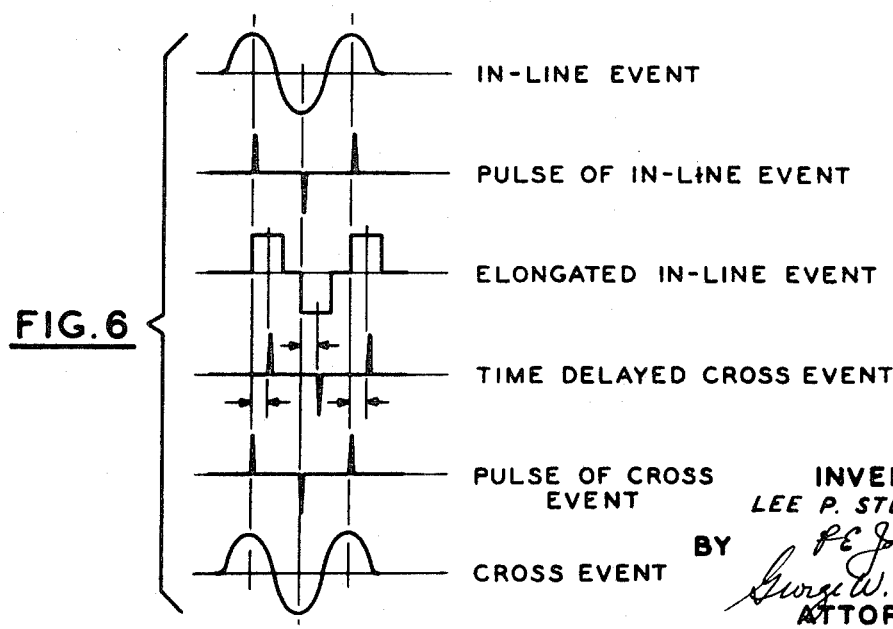
FIG. 6 represents waveform diagrams of the comparison of selected events from an in-line and a cross-directional seismic trace.

The in-line trace is first fed through a peaking circuit that converts the conventional wiggles to spikes controlled in time and polarity by the peaks and valleys of the seismic signals. These spikes are fed to a gate multivibrator 10 where each is converted to an elongated pulse with the period of elongation being preset by an earlier determination of the allowable time period for coincidence between common events on the two compared traces. Each reproduced trace from the auxiliary storage 97 on contactor 105 will also be fed through a peaking circuit converting it to spikes synchronized to the peaks and troughs and these spikes will be fed through a time delay circuit 108. Each sharp pulse is delayed from its actual time of occurrence by one-half of the period of elongation of the pulse from the multivibrator 107 and then fed to the coincidence detector 106. This time delay and pulse elongation procedure, illustrated by waveform analysis in FIG. 6, permits the identification of common events on the two records over the earlier determined allowable time period. The circuits for accomplishing the analysis of FIG. 6 are conventional and well known in the comparator arts.

It should be recalled that the selection of an event along an in-line directional seismic trace sets into motion the repeated comparison of that trace and its selected events with each of the stored, event-selected traces from the processed cross record. This procedure is essential to the complete analysis of the information that has previously been automatically selected from the cross geophone spread. Prior to each repeat of the generation of the in-line directional seismic trace, the decoder 102 decides whether a common event can exist on the two directional traces by a comparison of the $\Delta t$'s for the in-line and stored cross-directional trace in accordance with equation (3). The procedure of comparing an in-line trace to the stored cross traces will be continued until all acceptable stored traces have been searched for the existence of common events. Only after all traces have been compared will the in-line processor 94 be released from its repeat operation and be permitted to generate the next subsequent in-line, directional seismic trace. This interlock is effected by the connection of the "repeat signal" through contacts 195 of the decoder 102 to the adjuster 70.

COMPUTATION PLANE

Figure 17:
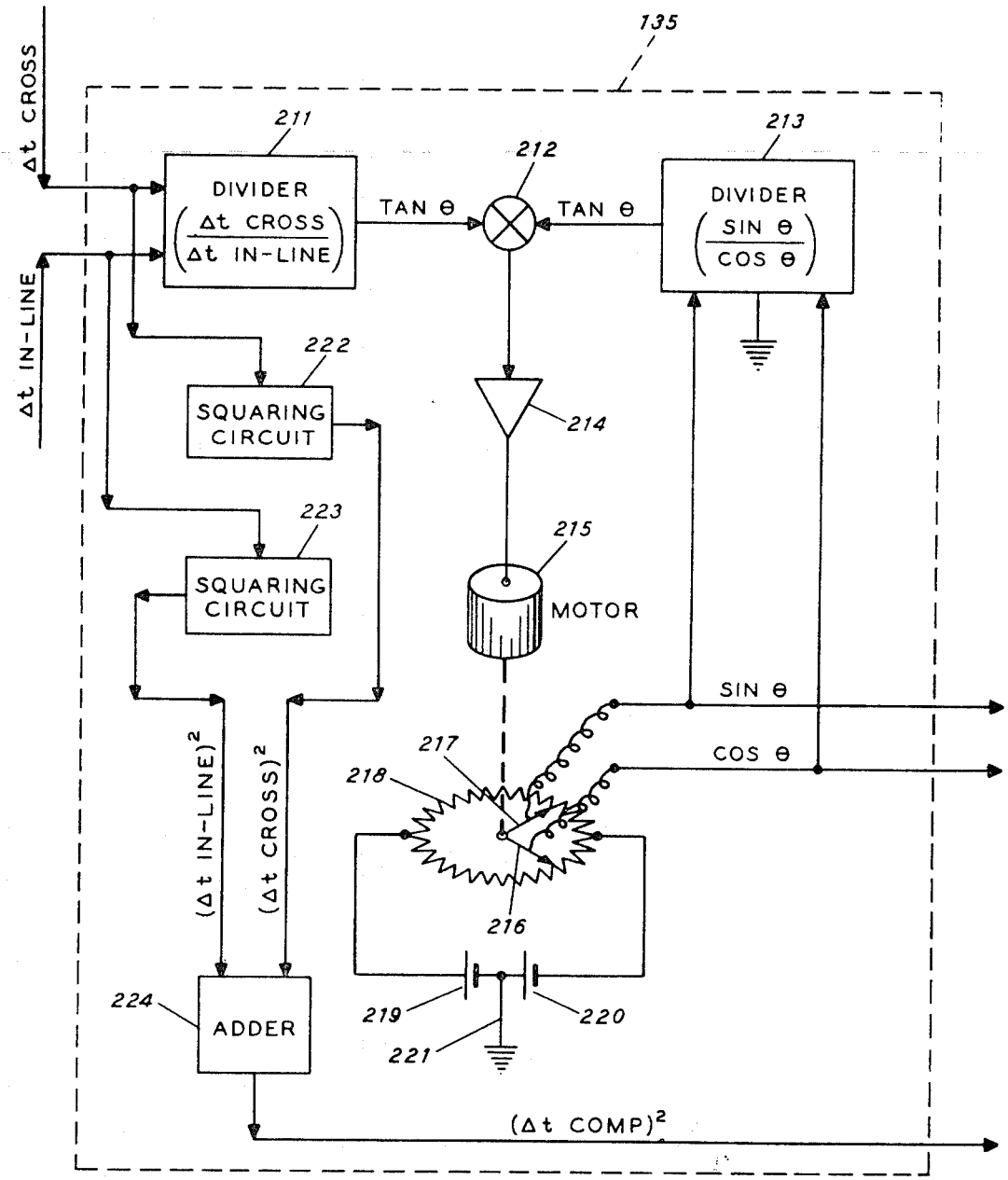
FIG. 17 is a schematic diagram of the azimuth angle resolver 135.

During the repeated comparisons of directional seismic traces in the coincidence detector 106, the processor 94 supplies $\Delta t$ in-line directional information, and the decoder 102 supplies $\Delta t$ cross-direction information to a ray path generator 109. These two pieces of information establish the coordinates of a plane in which the ray traced by the ray path generator will lie. Determination of the computation plane is described by C. H. Dix ("Seismic Prospecting for Oil," Harper & Brothers, 1952, at pages 166–167). Apparatus capable of performing this computation employs sine and cosine potentiometers and suitable servoamplifier control systems as shown in FIGS. 10 and 17. Such apparatus and its control is described in "Fundamental Theory of Servomechanisms," Le Roy MacColl, D. Van Nostrand Co., Inc., 1952, at page 6 et seq. A different plane of computation will be resolved with each of the pairs of direction information from the decoder 102 and processor 94.

FIG. 7 graphically illustrates the resolution and plotting method performed by the present invention. In this figure three planes are shown in perspective relation to each other. The planes as illustrated are intended to be vertical planes passing through a volume of an earth formation. The vertical relationship, the most usual case, has been selected to simplify the illustration. X, Y and Z directions are identified in the illustration.

The first plane, the X-plane, includes the in-line spread of geophones. The second plane, the Y-plane, includes the cross spread of geophones and, in the most preferred case, is perpendicular to the first plane. The third plane, the computation plane, passes through the intersection of the X-plane and Y-plane and has an angular relationship to the other planes. The angle is determined by the process of identifying common events with the apparatus of FIG. 5. The computation plane includes an identified event in its three-dimensional position with respect to the X-plane and the Y-plane and is a different plane with a different angular relationship to the X-plane and Y-plane with each pair of directional traces correlated in the coincidence detector 106. The X-plane is preferably also the plane of display of the correlated information and may be referred to a vertical reference datum plane including a datum point related to the source of seismic energy. As information is identified in the computation plane it will be angularly related to the reference plane and plotted in its projected position on the display plane.

Considering first the resolution of the angular relationship between the X-plane and the computation plane, it may be seen that each pair of directional traces will establish a particular computation plane. That is, a $\Delta t$ in-line and a $\Delta t$ cross T cross will identify a computation plane having an azimuthal angle $\theta$ with respect to the in-line spread established by the equation:

$$\theta = \tan^{-1}\left(\frac{\Delta t_{cross}}{\Delta t_{in\text{-}line}}\right) \quad (4)$$

See C. H. Dix, supra, page 166.

One system for determining the angle $\theta$ for the computation plane is shown in FIG. 17 where the apparatus illustrated constitutes the elements within the azimuth angle resolver 135 of the ray path computer 109 of FIGS. 5 and 10. The input to the resolver is the $\Delta t$ cross and $\Delta t$ in-line quantities derived from the decoder 102 and from the processor 94 respectively. These quantities are supplied to a divider 211 which produces the output quotient representing the tangent of $\theta$. That output is fed to an error detector 212. The other input to the error detector is an output quantity from a second divider 213 which produces a quotient signal of sine θ/cosine θ. The output signal from the error detector 212 is fed through an amplifier 214 to a motor 215 providing mechanical drive to a pair of contactors 216 and 217 that are moved about a rotary potentiometer 218. The potentiometer 218 is supplied with voltages at its end points from a pair of batteries 219 and 220 with a central ground at 221.

The movement of the contactors 216 and 217 is intended to produce output quantities on conductors connected to these contactors representing cosine θ and sine θ respectively. These two quantities are supplied to the divider 213 where the quotient representing tangent θ is provided as an output. The operation of the device is such that when two Δt quantities are supplied to the divider 211 there will be produced a tangent θ quantity representing the position of the computation plane with respect to the X-plane and the Y-plane of the in-line and cross geophone spreads respectively and the position to which the shaft of motor 215 should be adjusted. The other input to the error detector 212 is the output from divider 213 representing the actual position of the shaft of motor 215. The error signal from the detector 212 then energizes the motor 215 and causes it to assume the desired position. Having assumed that position, there will be supplied from the contactors 216 and 217 the desired quantities cosine θ and sine θ for use in the ray path computer.

The ray path computer 109 resolves the two components of directional information supplied to it to generate the continuous coordinates of the ray path common to the compared traces in the plane of computation in the manner described with respect to FIG. 1 and as described in the copending application Ser. No. 416,947 previously identified. At the same time, the coincidence detector 106 is searching for common events on the two event-selected directional traces. The output of the ray path computer 109 to the plotter 110 will be continuous coordinates of the ray path to be traced modified according to the azimuthal angular relationship as computed above between the computation plane and a reference plane. The reference plane will usually be the same as the display and may preferably be a vertical plane including the in-line spread of geophones. The display plane may be any vertical plane passing through a selected reference datum point. The plotter will display the projection of the computed ray path so that dimensions in the Z direction will be true dimensions and dimensions in the X direction will be the computed X coordinate modified by the cosine of the angle between the computation plane and the display plane. A Y direction dimension may be determined by the ray path computer by modifying the computed X coordinate in accordance with the sine of the angle between the computation plane and the display plane.

The process of generating coordinate quantities representing positions along a ray path was described with respect to FIG. 1 and FIG. 14. For the purpose here the same apparatus is employed with prepunched cards selected in accordance with the Δt of the ray path in the computation plane that is common to the Δt in-line and the Δt cross quantities.

The Δt comp may be determined as stated in equation 2 in the decoder section; however, after resolving the quantity proportional to Cos θ it is possible to determine Δt comp by the relationship:

$$\Delta t \text{ comp} = \Delta t \text{ in-line Cos } \theta$$

For that purpose, the azimuth angle resolver 135 includes a multiplier 222 having an input of Cos θ and Δt in-line. The output is the desired Δt comp.

The Δt comp is then fed to a ray path generator of the form previously described where that quantity is used to select the appropriate prepunched card containing the quantities representing coordinate positions along a ray path.

As shown in FIG. 7, a ray path 120 is simulated in the computation plane as in-line and cross-directional traces are compared. Along the simulated ray path an event 121 is correlated in compared in-line and cross traces. The event has appropriate coordinates in the computation plane determined by the ray path computer 109 as it generates the necessary coordinate voltages to simulate the ray path being followed. These coordinates in the computation plane establish the x distance of the event away from the reference point along the earth's surface and the z distance of the event below the earth's surface. The y distance of the event away from the X-plane is a function of the angular relationship between the computation plane and the X-plane as well as the time of the event along the simulated ray path. As previously described, it is a purpose of the present invention to present all of this coordinate information on a two-dimensional display surface so that each display alone will convey three-dimensional information. As illustrated in FIG. 7 that is accomplished by projecting a representation of the correlated event on the display plane here shown as the X-plane.

With the resolved azimuthal angle θ, the projection of a correlated event within the computation plane to the X-plane can be readily accomplished. The ray path generator 109 employs the Δt comp quantity and a signal of time along the records being processed to generate x and z coordinates of positions along the ray path in the computation plane in the manner described with respect to FIG. 1. The x coordinate, in the computation plane, and the azimuthal angle θ determine the actual x coordinate from the display reference point and parallel to the earth's surface for the subsurface event; X-display being x computation multiplied by cosine of θ. The z coordinate, in the computation plane, will remain the same through the projection process and will establish the coordinate from the display reference point in a vertical direction for the subsurface event.

The y coordinate in the display of the projected event is also derived from the x coordinate in the computation plane. In the projection display the y coordinate is the horizontal distance to the correlated event from the display plane. That distance is the x coordinate, in the computation plane, multiplied by the sine of θ. This coordinate is to be plotted with the projected event as a numerical quantity and is derived from the ray path computer in numerical form from a suitable device such as a digital voltmeter.

Figure 8:
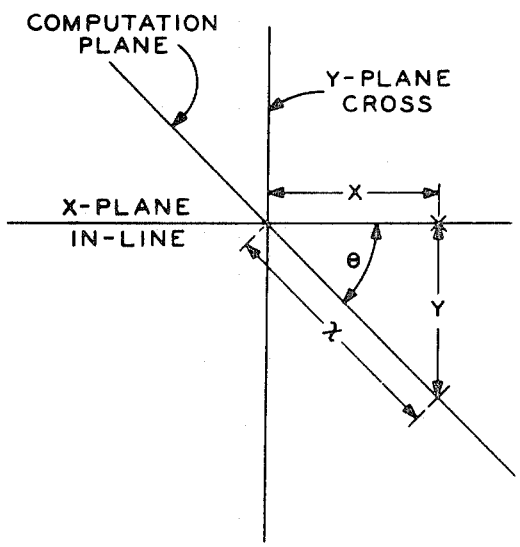
FIG. 8 is a plan view of FIG. 7.
Figure 9:
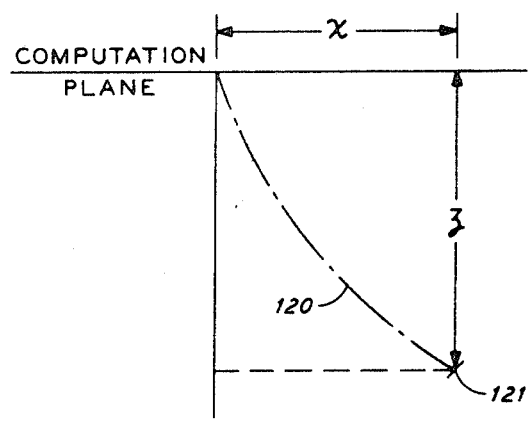
FIG. 9 is an elevational view of the computation plane with a correlated event.

FIGS. 8 and 9 illustrate in plan and elevation, respectively, the planes and the correlated event shown in perspective in FIG. 7.

TIME DELAY CIRCUITS

Referring again to FIG. 5, the coincidence circuits and ray path generator have not established the existence of a common event and the path that it could follow. If a signal representing that event is to be plotted it is desirable to plot all of the event; its beginning and end. For that purpose delay circuits 111 and 112 are required to provide energization to the plotter 110 for movement control and for display that will illustrate the signal buildup of a seismic event. It should be apparent that the foregoing comparisons of events on in-line and cross traces will be performed at or substantially near to a signal peak on one or the other of the traces. It is desired to display an entire event which may include some of the event prior to and some of the event after the actual comparison time when the existence of a common event was detected. Time delay 112 therefore delays the event to the plotter so that when the plotter is turned ON it will begin plotting on a portion of the event earlier than the time on the trace of the actual comparison. Time delay 111 performs the same function in operating the movement control of the plotter. These time delays will cause the buildup of an event to be plotted.

Event decay is also of interest in evaluation of a seismic signal. For that reason hold circuit 113 elongates the coincidence signal and keeps the plotter operating after a common event has been located. The plotted event will therefore have both the buildup and the decay of the detected event.

If only a representation of the common information on the in-line and cross traces is to be displayed, then the delay circuits 111 and 112 and the hold circuit 113 may be inactivated. The plotter can then plot a mark of some type, see FIGS. 10 and 11, representing the position of an event along a seismic trace.

EVENT PROJECTION

FIG. 10 illustrates the manner of projecting event representations from information derived from the ray path generator. The ray path generator 109 is here illustrated as including a punchcard reader 130 and its associated circuits capable of computing the continuous coordinates of a ray path in the computation plane in accordance with the quantities contained in suitable punched cards as previously stated. The input to the ray path generator is the $\Delta t$ in-line and $\Delta t$ cross from the processors 94 and 93. Output signals are supplied to the X-drive generator 131 and the Z-drive generator 132 for energization of X-drive motor 133 and Z-drive motor 134. Also included in the ray path generator is the azimuth angle resolver 135 energized by the two $\Delta t$ input signals and supplying sine $\theta$ and cosine $\theta$ functions for the cosine multiplier 136 and the sine multiplier 137. The sine $\theta$ signal is also employed to energize an azimuth angle projection counter 138.

The X-rate tachometer 139 and the Z-rate tachometer are part of the ray path generator and are energized by X-drive and Z-drive signals, respectively. The tachometers supply rate signals to a dip angle resolver 142 where an angle signal is generated representing the perpendicular direction in the computation plane to the instantaneous positions along the generated ray path. The dip angle resolver 142 supplies output signals to a dip angle projection counter 143 and to the deflection elements of a projection oscilloscope 144. The computation of the perpendicular direction by the dip angle resolver is fully described in the aforementioned W. W. Klein patent for "Apparatus for Generating Sine and Cosine Functions."

The ray path generator 109 supplies the X-drive signal to drive motor 133 as modified by the cosine of the azimuth angle in multiplier 136 and also supplies a Y-distance signal, as previously defined, represented by the $x$ distance coordinate from the ray path generator modified by the sine of the azimuth angle in multiplier 137. This modified coordinate signal energizes a Y-distance projection counter 145.

As shown in FIG. 10, the plotter constitutes a cylindrical drum 146 having a photosensitive display surface 147 fixed thereto. The drum is driven by the X-drive motor 133 to rotate about its cylinder axis. Information is plotted on the display surface by projecting an image of the light spot on the face of an oscilloscope 144 through suitable lens systems to the display surface. The image of the light spot is movable in accordance with energization of the deflection system of the oscilloscope and the oscilloscope itself is movable parallel to the axis of the plotter drum in accordance with energization of the Z-drive motor 134. The ray path generated by generator 130 is therefore traced by an image of the light spot as the drive motors 133 and 134 are energized from the computer 109.

FIG. 11 illustrates an exploded view of the encircled portion of the display of FIG. 10. As here illustrated, an event is identified by a dip bar 151 along a simulated ray path 152. The display as projected includes a numerical Y-distance indication 153 here shown as +3,990 indicating that the event displayed by dip bar 151 is 3,990 feet in front of the display plane or, as explained earlier in this specification, the perpendicular distance from the correlated seismic event along an orthographic projection line to the display surface is 3,990 feet. A negative sign (−) would indicate an event behind the display plane. Also displayed with the dip bar is an angular indication 154 representing the dip angle 60° for the correlated event along the ray path 152 in the computation plane. This angle is the angle between the horizontal at the position of the event and the bedding plane within a formation that has contributed the reflection seismic information. A second plotted angular number 155 represents the azimuth angle 45° between the computation plane and the display surface. The projected angle indications may be seen graphically in FIGS. 8 and 9 where the azimuth angle $\theta$ of FIG. 8 is identified by reference 154 and the dip angle of FIG. 8 is identified by reference 153.

SUMMARY

Figure 18:
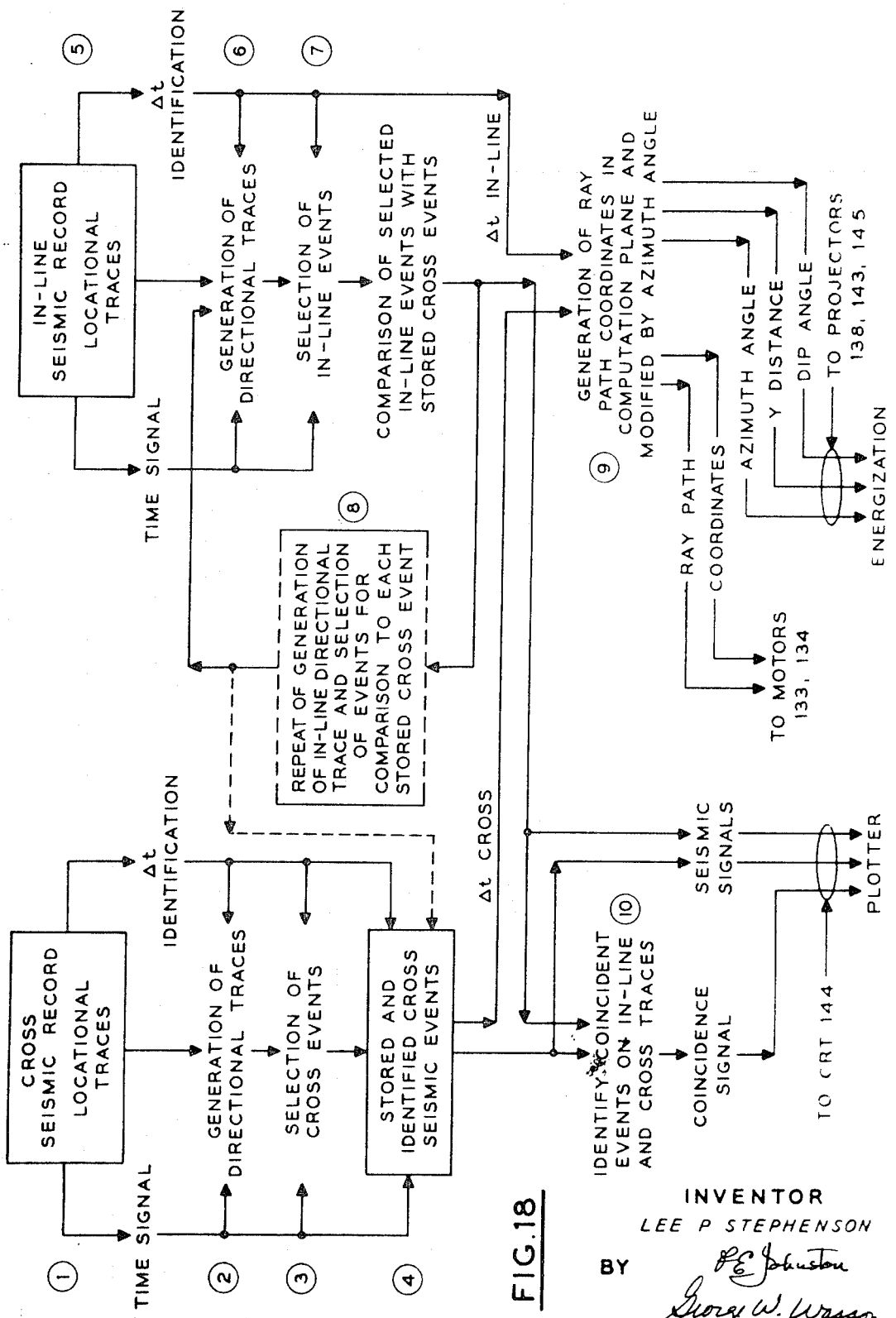
FIG. 18 is a flow sheet showing the complete process of the present invention.

In summary, the process of the present invention involves the following steps illustrated in flowsheet form in FIG. 18.

1. Reproduce cross-record traces with reproducing heads aligned at $\Delta t$ angles across the record with respect to the time axis.

2. Sum individual trace signals to produce cross-directional traces—identify each directional trace by its $\Delta t$ head positions.

3a. Record sufficient cross-directional traces to permit event selection.

b. Select events along each cross-directional trace.

4. Record cross-directional traces containing seismic events and identify stored traces by their $\Delta t$.

5. Reproduce in-line record traces with reproducing heads aligned at $\Delta t$ angles across the record with respect to the time axis.

6. Sum individual trace signals to produce in-line directional traces—identify each directional trace by its $\Delta t$ head positions.

7a. Record sufficient in-line directional traces to permit event selection.

b. Select events along each in-line directional trace.

8. Supply $\Delta t$ in-line information to decoder for preliminary comparison to stored $\Delta t$ cross information to determine if any plane is possible where a common event could exist. When a possible plane is found, repeat generation of in-line directional trace by holding reproducing heads in the same position until all stored cross-directional traces have been reproduced in synchronism with the generated in-line directional trace.

9. Using the $\Delta t$ in-line and $\Delta t$ cross information resolve a computation plane and the angle $\theta$ of that plane with respect to a display plane and $\Delta t$ comp for ray paths in that computation plane:

a. select the appropriate information (punched card) for a subsurface seismic ray path with $\Delta t$ comp quantity;
   b. generate the continuous coordinate signals that represent positions along the selected ray path;
   c. modify one coordinate position ($x$ position) signal by the cosine of the angle $\theta$ to energize a display surface position control motor, and employ the other coordinate position ($z$ position) signal for energization of a plotter position control motor;
   d. modify the $x$ position continuous signals by the sine of the azimuth angle to generate a quantity representing the distance from a point on the computation plane to a projection of that point on the display plane (Y distance);
   e. generate a quantity representing the perpendicular to successive positions along the generated ray path (dip angle) in the computation plane;

and supply the above quantities and signals to a plotting device to permit signals to be plotted to represent seismic events along the projection of a ray path being generated.

10. Compare the generated in-line directional trace to reproductions of the stored cross-directional traces in a coincidence-detecting circuit to identify the existence of common selected events on the two compared traces and energizing the plotting device to permit the information derived in step 9 to be plotted when coincidence is found.

It may be seen that the plotting apparatus of the present invention, when energized by appropriate seismic records through the electrical circuits of FIGS. 1 and 5, will provide for the automatic processing of seismic data received at a surface geophone spread to derive directional seismic information, to select events within the directional seismic information and to plot the selected directional seismic events on a two-dimensional display surface with indications of the true three-dimensional position for subsurface reflectors. It should be understood that the display of FIGS. 10 and 11 is but a single event and that additional events from within the volume of earth formation being surveyed from each individual reference point will provide information about as many reflectors as may be identified within the volume. Furthermore, as additional information from different reference points within a single survey are plotted, these plotted events will correlate with each other so that the plotted information from one reference point may be "tied" to other plotted information within the display.

The block diagram illustrations of the apparatus for performing the method of the present invention are both greatly simplified in detail and generalized in components. It should be understood that the geophone spreads illustrated are merely representative of a plurality of forms that the geophone spreads may assume. Furthermore, the reproducible recording device is one of several possibilities with the magnetic system illustrated having been chosen primarily because of the ease of illustrating the adjustment features for the recording and pickup heads of such a device.

The spread configuration of FiG. 4 may be employed with the data processor of FIG. 1 to resolve true three-dimensional information for detected seismic events. The data detected with this spread configuration may be combined in many different time-related combinations to produce directional seismic traces. These traces may then be compared to directional seismic traces in neighboring directions to select appropriate events for plotting. The computation plane will be resolved in accordance with the directional trace generated for each of the plurality of data combinations. Projection is accomplished in the same manner as that described for the in-line and cross-spread configuration and is accompanied by the same projection distance and attitude plot.

While certain preferred embodiments of the invention have been specifically disclosed, it should be understood that the invention is not limited thereto as many variations will be readily apparent to those skilled in the art and the invention is to be given its broadest possible interpretation within the terms of the following claims:

I claim

1. A method for plotting on a display plane representing a cross section through an earth formation data representing subsurface seismic reflectors within said earth formation form original reflection seismic data in the form of locational traces in a reproducible seismic record of amplitude-versus-arrival-time signals and detected at the surface of said earth formation with a surface spread configuration of geophone detectors arranged in a pair of spreads, said display plane having a known relationship with respect to said spreads, said spreads being generally aligned perpendicular to and intersecting each other, and said reflections being in response to seismic energy generated at said earth's surface at a predetermined single position with respect to said spread configuration, then:

a. separately recording reproducible records in the form of said locational seismic traces of amplitude-versus-arrival-time signals, a separate record of side-by-side individual time-referenced traces being recorded for each of said pair of spreads;

b. then operating an automatic machine to perform the steps of repeatedly reproducing said signals along each trace of a first of said records of locational seismic traces produced by a first spread of said pair of geophone spreads, in each repeated reproduction of said first record systematically shifting the time reference of each trace with respect to its neighbor trace a predetermined incremental different amount of time shift, each reproduction being at a different fixed incremental time shift and representing an alignment across said record of side-by-side traces for directionally distinct reflections;

c. and then operating said automatic machine to perform the steps of algebraically summing the instantaneous amplitude of said reproduced signals along said locational traces of said first record in a plurality of different time-related summations to produce and record as side-by-side traces a first set of directional seismic traces of amplitude-versus-arrival-time signals, one trace being produced for each different time-related summation of said repeatedly reproduced locational traces, adjacent traces being identified by and representing adjacent directions for subsurface reflections to said first of said pair of spreads;

d. then operating said automatic machine to separately process each trace of said first set of directional seismic traces by comparing signals along each trace with signals along traces representing adjacent directions and identifying similarities in compared signals as representations of seismic events to select traces within said first set containing reproducible signals representing seismic events identifying subsurface seismic reflectors in both time and direction with respect to said first of said pair of spreads, and reproducibly recording only said event selected traces of said first set;

e. then operating said automatic machine to perform the steps of repeatedly reproducing said signals along each trace of the other of said records of locational seismic traces produced by the other spread of said pair of geophone spreads, in each repeated reproduction of said other of said records systematically shifting the time reference of each trace with respect to its neighbor trace the same predetermined incremental different amount of time shift as employed in producing said first set of directional traces;

f. then causing said automatic machine to algebraically sum the instantaneous amplitude of said reproduced signals along said locational traces of said other record in a plurality of different time-related summations to produce and record in sequence separate traces of a second set of directional seismic traces of amplitude-versus-arrival-time signals, one trace being produced for each different time-related summation of said repeatedly reproduced other locational traces, adjacent traces being identified by and representing adjacent directions for subsurface reflections to said other of said pair of spreads;

g. then operating said automatic machine to separately process each trace of said second set of directional seismic traces in sequence by comparing signals along each trace with signals along traces representing adjacent directions and identifying similarities in compared signals as representations of seismic events to identify along each trace within said second set, as each trace is being processed, the presence of at least one reproducible signal representing a selected seismic event identifying a subsurface seismic reflector in both time and direction with respect to said other of said pair of spreads;

h. then causing said automatic machine to repeatedly reproduce said event-selected trace of said second set and sequentially compare signals along said repeated event-selected trace of said second set with signals along each of said reproducibly recorded event-selected traces of said first set to identify similarities in compared signals, and to generate a coincidence pulse in response to said comparison identifying signals representing the same seismic event in two directional traces, one trace from each set;

i. while comparing said event-selected traces causing said automatic machine to resolve a computation plane from said directional identification of said repeatedly reproduced event selected trace of said second set and said directional identification of each of said event-selected reproduced traces of said first set, said computation plane being that plane with respect to said first spread and said other spread that includes said event common to said compared event-selected directional traces, said computation plane thereby being resolved with respect to said display plane;

j. during said comparison of said event-selected traces causing said automatic machine to generate representations of coordinate positions within said computation plane from said arrival time and direction identification of events along said event-selected traces; and k. then operating said automatic machine to move a means for producing a visible display with respect to said display plane in accordance with said representations of coordinate positions within said computation plane, and energizing said means for producing said visible display with said coincidence pulse to produce visible representations of said signals representing said same seismic event in said two event-selected directional traces on said display plane.

2. The method of claim 1 wherein said visible display of said seismic event is an orthographic projection to said display plane of said coordinate positions within said computation plane.

3. In the method of claim 1 the additional step of causing said automatic machine to produce a visible display of said subsurface seismic reflector on said display plane with visible information representing an indication of the orthographic projection distance from each identified event common to said compared event selected directional traces by modifying the coordinate position of each displayed event in accordance with the angle between said computation plane and said display plane.

4. In the method of claim 1 the additional step of causing said automatic machine to produce a visible display of said subsurface seismic reflector on said display plane with visible information representing an indication of the azimuthal direction from said intersection of said surface spreads and the dip angle of said reflector within said subsurface with respect to the surface of said earth formation for each identified event common to said compared event selected traces, said azimuthal direction being determined by the angle between said computation plane and the vertical plane including one of said pair of spreads, and said dip angle being determined by time along one of said compared traces.

5. The method of claim 2 with the additional step of causing said automatic machine to display the projection direction with said visible display.

6. Apparatus for plotting on a display plane representing a cross section through an earth formation data representing subsurface seismic reflectors within said earth formation and derived from original reflection seismic data in the form of locational traces in a reproducible seismic record of amplitude-versus-arrival-time signals and detected at the surface of said earth formation with a surface spread configuration of geophone detectors arranged in a pair of spreads, said display plane having a known relationship with respect to said spreads, said spreads being generally aligned perpendicular to and intersecting each other, and said reflections being in response to seismic energy generated at said earth's surface at a predetermined position with respect to said spread configuration, comprising an automatic machine having in combination:

a. means for separately recording reproducible records in the form of said locational seismic traces of amplitude-versus-arrival-time signals, a separate record of side-by-side individual time-referenced traces being recorded for each of said pair of spreads;

b. means for repeatedly reproducing said signals along all traces of first of said records of locational seismic traces produced by a first spread of said pair of geophone spreads, each means including means operable in each repeated reproduction of said first record for systematically shifting the time reference of each trace with respect to its neighbor trace a predetermined incremental different amount of time shift, said means operable being adjustable so that each reproduction is at a different fixed incremental time shift and represents an alignment across said record of side-by-side traces for directionally distinct reflections;

c. means for algebraically summing the instantaneous amplitude of said reproduced signals along said locational traces of said first record with each repeated reproduction so as to produce a plurality of different time-related summations, and means for recording said summations as a first set of side-by-side directional seismic traces of amplitude-versus-arrival-time signals, one directional trace being produced for each different time-related summation of said repeatedly reproduced locational traces, adjacent directional traces being identified by and representing adjacent directions for subsurface reflections to said first of said pair of spreads;

d. means for separately processing each trace of said first set of directional seismic traces by separately comparing signals along each trace with signals occurring at the same time along traces representing adjacent directions and correlating similarities in compared signals as representations of seismic events, said processing means including means for selecting by said comparison and correlation those traces within said first set that contain reproducible signals representing seismic events identifying subsurface seismic reflectors in both time and direction with respect to said first of said pair of spreads, and further means energized by said selecting means in said processing means for reproducibly recording only said event-selected traces of said first set, including time and direction identification signals for said traces;

e. means repeatedly reproducing said signals along all traces of the other of said records of locational seismic traces produced by the other spread of said pair of geophone spreads, said means including means operable in each repeated reproduction of said other of said records for systematically shifting the time reference of each trace with respect to its neighbor trace the same predetermined incremental different amount of time shift as employed in producing said first set of directional traces;

f. means for algebraically summing the instantaneous amplitude of said reproduced signals along said locational traces of said other record with each repeated reproduction so as to produce a plurality of different time-related summations, a second set of directional seismic traces of amplitude-versus-arrival-time signals, one directional trace being produced for each different time-related summation of said repeatedly reproduced other locational traces, adjacent directional traces being identified by and representing adjacent directions for subsurface reflections to said other of said pair of spreads;

g. means for separately processing each trace of said second set of directional seismic traces in sequence by separately comparing signals along each trace with signals occurring at the same time along traces representing adjacent directions and by correlating similarities in compared signals as representations of seismic events, said processing means including means for identifying by said comparison and correlation along each trace within said second set, as each trace is being separately processed, the presence of at least one reproducible signal representing a selected seismic event identifying a subsurface seismic reflector by both time and direction identification signals with respect to said other of said pair of spreads;

h. means operable by said means for identifying a selectable event in said second set of directional seismic traces for repeatedly reproducing said trace containing a selected seismic event of said second set and, in sequence, each trace of said event-selected traces of said first set, and means for sequentially comparing signals along said repeatedly reproduced trace of said second set with signals along each of said reproducibly recorded event-selected traces of said first set to identify signal coincidence in compared signals along said compared traces, said means being operable to generate a coincidence pulse in response to said comparison for identifying electrical signals representing the same seismic event in two directional traces, one trace from each set;

i. and means for resolving a computation plane, said means being energized by said directional identification signal of said repeatedly reproduced, event-selected trace of said second set and said directional identification signal of each of said sequentially reproduced, event-selected traces of said first set, said computation plane being that plane with respect to said first spread and said other spread that includes said compared event-selected directional trace of said first and second set, said computation plane thereby being resolved with respect to said display plane;

j. means for generating representations of coordinate positions within said computation plane from said arrival time and direction identification signals of events along said event-selected traces; and k. a plotting means for producing a visible display with respect to said display plane in accordance with said representations of coordinate positions within said computation plane including means for energizing said plotting means with said coincidence pulse so as to produce visible representations of said signals representing said same seismic event in said two event-selected directional traces on said display plane.

7. The apparatus of claim 6 with the additional means for producing a visible display of said subsurface seismic reflector on said display plane with visible information representing an indication of the orthographic projection direction and distance from each identified event common to said compared event-selected directional traces, said means being means energized by said means for resolving a computation plane and being operable to modify the coordinate position of each displayed event in accordance with the angle between said computation plane and said display plane.

8. The apparatus of claim 6 with the additional means for producing a visible display of said subsurface seismic reflector on said display plane with visible information representing an indication of the azimuthal direction from said intersection of said surface spreads and the dip angle of said reflector within said subsurface with respect to the surface of said earth formation for each identified event common to said compared event-selected traces, said means being energized by said means for resolving a computation plane and being operable to produce a numerical representation of said azimuthal direction of said computation plane and the dip of said identified event within said computation plane being determined from said identification of time along one of said compared traces.

9. A method for establishing true positional information for subsurface seismic reflectors with respect to a reference plane from seismic data detected by a plurality of surface geophones positioned adjacent to the surface of an earth formation in a predetermined geophone spread configuration comprising the steps of:

detecting movements of said earth formation at said geophone locations in response to the reflection of energy from a seismic disturbance initiated within said earth formation adjacent to said surface;

reproducibly recording locational traces of signals representing said movements at each of said geophone locations; then a. operating an automatic machine to perform the steps of combining said traces from a first selected group of geophones in a plurality of different time-related combinations to produce directional seismic traces from said combined locational traces;

b. combining said traces from a second selected group of geophones in a like plurality of similar time-related combinations to produce additional directional seismic traces from said combined locational traces;

c. machine processing each of said first directional seismic traces to select seismic events identifying said reflectors with respect to said first group of geophones, machine processing said second directional seismic traces to select events identifying the same said reflectors with respect to said second group of geophones;

d. automatically machine comparing said selected events along directional traces from said first machine processing to said selected events along directional traces from said second machine processing to identify correlations of the same event with respect to both of said groups of geophones;

e. automatically producing information representing the true position of said reflectors from the directional information contained in said compared directional seismic traces.

10. A method for establishing positional information for subsurface seismic reflectors from seismic data detected by a plurality of surface geophones positioned adjacent to the surface of an earth formation in a predetermined geophone spread configuration comprising the steps of:

detecting movements of said earth formation at said geophone locations in response to the reflection of energy from a seismic disturbance initiated within said earth formation adjacent to said surface;

reproducibly recording locational traces of signals representing said movements at each of said geophone locations; then a. operating an automatic machine to perform the steps of reproducing and combining said traces from a first selected group of geophones in a plurality of different time-related combinations to produce directional seismic traces from said combined locational traces;

b. machine processing said first directional seismic traces to select seismic events identifying said reflectors with respect to said first group of geophones;

c. reproducing and combining said traces from a second selected group of geophones in a like plurality of similar time-related combinations to produce additional directional seismic traces, said second directional seismic traces being combined in perpendicular related relationship to said first directional seismic traces;

d. machine processing each of said second directional seismic traces as it is produced to select events identifying said reflectors with respect to said second group of geophones;

e. automatically machine-comparing each processed second directional seismic trace containing a selected event with each processed first directional seismic trace containing a selected event;

f. during said machine comparison of processed first and second directional seismic traces containing selected events, from predetermined representation of subsurface velocity of transmission of seismic energy machine generating sequential coordinate positions along a seismic ray path common to both said first and second directional seismic traces;

g. machine-correlating said selected events within said compared first and second directional seismic traces to identify by said automatic machine, those events representing the same seismic reflector in both of said directional seismic traces;

h. then machine-generating information representing the true position of said reflector from the directional information combined in said compared directional seismic traces.

11. In the method of claim 10 the additional step of automatically machine-plotting a representation of said subsurface seismic reflector on a display surface along an orthographic projection of said machine-generated seismic ray path.

12. In the method of claim 10 the additional step of automatically machine-plotting a machine-generated representation of said subsurface seismic reflector on a display surface with machine-generated visible information representing an indication of the orthographic projection distance to said display surface from each correlated event along said machine-compared first and second directional seismic traces and along said machine-generated common ray path.

13. In the method of claim 10 the additional step of automatically machine-plotting a machine-generated representation of said subsurface seismic reflector on a display surface with machine-generated visible information representing an indication of dip angle for each correlated event along said machine-generated common ray path.

14. In the method of claim 10 the additional step of automatically machine-plotting a machine-generated representation of said subsurface seismic reflector on a display surface with machine-generated visible information representing an indication of strike angle for each correlated event along said machine-generated common ray path.

15. In the method of claim 10 the additional step of automatically machine-plotting a machine-generated representation of said subsurface seismic reflector on a display surface with visible information representing an indication of dip angle, strike angle representing of the orthographic projection distance to said display surface from each correlated event along said machine-generated common ray path.

16. The method of claim 15 with the additional step of automatically machine-generating and displaying the projection direction with said machine-plotted representations.

17. Apparatus for plotting a seismic cross section display of data representing subsurface seismic reflections within an earth formation from original reflection seismic data in the form of locational traces in a reproducible seismic record of time-varying information and detected at the surface of said earth formation with a surface spread configuration of geophone detectors arranged in a pair of spreads, said spreads being generally aligned perpendicular to each other, said reflections being in response to seismic energy generated at said earth's surface at a predetermined position with respect to said spread configuration, comprising in combination:

a. automatic means for separately recording reproducible records in the form of locational seismic traces for each of said pair of spreads;

b. automatic means for repeatedly reproducing a first of said records of locational seismic traces;

c. automatic means for combining said repeatedly reproduced locational traces of said first record in a predetermined plurality of different time-related combinations to produce a first set of directional seismic traces from said combined locational traces;

d. automatic event-selecting means for processing each of said first set of directional seismic traces to select traces within said first set containing seismic events identifying subsurface seismic reflectors and including means for separately recording and reproducing said selected traces of said first set;

e. automatic means for repeatedly reproducing the other of said records of locational seismic traces;

f. automatic means for combining said repeatedly reproduced locational traces of said other record in a predetermined plurality of different time-related combinations to produce a second set of directional seismic traces from said combined locational traces;

g. automatic event-selecting means for processing each of said second set of directional seismic traces to identify traces within said second set containing at least one selected seismic event identifying subsurface seismic reflectors;

h. automatic means for comparing each identified trace of said traces of said second set containing selected events with each of said separate reproducibly recorded selected traces of said first set;

i. automatic ray path coordinate data generating means controlled by said means for processing said second set of directional seismic traces and by said means for recording and reproducing said selected directional traces of said first set and operable to generate time-related sequential coordinate data identifying consecutive positions along a simulated ray path followed by said seismic energy generated at the earth's surface to said subsurface reflector and back to said spread configuration, said generated data representing a ray path for seismic energy capable of containing a selected event common to both a directional seismic trace of said first set and said identified directional seismic traces of said second set;

j. automatic coincidence detector means for comparing said selected events on each identified trace of said second set of directional seismic traces controlling said ray path generating means and each of said stored traces containing selected events from said first set of directional seismic traces and simultaneously controlling said ray path generating means, and means in said automatic coincidence detector for producing a coincidence signal upon the occurrence of coincidence between a selected event on said first and second compared directional seismic traces; and k. an automatic plotter and means for energizing said plotter by said ray path coordinate data and said coincidence signal from said coincidence detector to produce said seismic cross section display.

18. Apparatus for plotting a seismic cross section display of data representing subsurface seismic reflections within an earth formation from original reflection seismic data in the form of locational traces in a reproducible seismic record of time-varying information and detected at the surface of said earth formation with a surface spread configuration of geophone detectors arranged in a pair of spreads, said spreads being generally aligned perpendicular to each other, said reflections being in response to seismic energy generated at said earth's surface at a predetermined position with respect to said spread configuration, comprising in combination:

a. means for separately recording reproducible records in the form of locational seismic traces for each of said pair of spreads;

b. means for repeatedly reproducing a first of said records of locational seismic traces;

c. means for combining said repeatedly reproduced locational traces of said first record in a plurality of different time-related combinations to produce a first set of directional seismic traces from said combined locational traces;

d. means for processing each of said first set of directional seismic traces to select traces within said first set containing seismic events identifying subsurface seismic reflectors and including means for recording and reproducing said selected traces of said first set;

e. means for repeatedly reproducing the other of said records of locational seismic traces;

f. means for combining said repeatedly reproduced locational traces of said other record in a plurality of different time-related combinations to produce a second set of directional seismic traces from said combined locational traces;

g. means for processing each of said second set of directional seismic traces to identify traces within said second set containing at least one selected seismic event identifying subsurface seismic reflectors;

h. means for comparing each identified trace of said traces of said second set containing selected events with each of said reproducibly recorded selected traces of said first set;

i. ray path coordinate data generating means controlled by said means for processing said second set of directional seismic traces and by said means for recording and reproducing said selected directional traces of said first set and operable to generate time-related coordinate data identifying consecutive positions along a simulated ray path followed by said seismic energy from the earth's surface to said subsurface reflector and back to said spread configuration, said generated data representing a ray path for seismic energy capable of containing a selected event common to both a directional seismic trace of said first set and said identified directional seismic traces of said second set;

j. coincidence detector means for comparing said selected events on each identified trace of said second set of directional seismic traces controlling said ray path generating means and each of said stored traces containing selected events from said first set of directional seismic traces and simultaneously controlling said ray path generating means, and means in said coincidence detector for producing a coincidence signal upon the occurrence of coincidence between a selected event on said first and second compared directional seismic traces; and k. a plotter and means for energizing said plotter by said ray path coordinate data and said coincidence signal from said coincidence detector to produce said seismic cross section display.

* * * * *

PO-1050
(5/69)

UNITED STATES PATENT OFFICE
CERTIFICATE OF CORRECTION

Patent No. 3,638,178          Dated    Jan. 25, 1972

Inventor(s)   Lee P. Stephenson

It is certified that error appears in the above-identified patent and that said Letters Patent are hereby corrected as shown below:

Col. 6, line 34, "criterion" should read --existence--.
" 13, line 62, "in-hine" should read --in-line--.
" 14, line 10, the formula should read --$(\Delta t_{cross})^2$--
" 15, line 23, "$\Delta$cross" should read --$\Delta$t cross--;
       line 42, "multivibrator 10" should read --multivibrator 107--.
" 16, line 57, "$\Delta$t cross T" should read --$\Delta$t cross will---.
" 18, line 49, "have not" should read --have now--.
" 20, line 4, "FIG. 8" should read --FIG. 9--.

In the Claims
Col. 26, line 63, "combined in" should read --contained in--.
" 27, line 17, "strike angle representing of the orthographic" should read --strike angle and of the orthographic--.

Signed and sealed this 28th day of November 1972.

(SEAL)
Attest:

EDWARD M. FLETCHER, JR.          ROBERT GOTTSCHALK
Attesting Officer                  Commissioner of Patents